US012337936B2

(12) United States Patent
Mermiris et al.

(10) Patent No.: US 12,337,936 B2
(45) **Date of Patent: *Jun. 24, 2025**

(54) BUNKERING MARINE VESSEL

(71) Applicant: Tritec Marine Ltd., Clydebank (GB)

(72) Inventors: Georgios Mermiris, Scotland (GB); David Philip Scott, Argyll & Bute (GB); Jamie Roberts, Scotland (GB)

(73) Assignee: Tritec Marine Ltd., Clydebank (GB)

( * ) Notice: Subject to any disclaimer, the term of this patent is extended or adjusted under 35 U.S.C. 154(b) by 703 days.

This patent is subject to a terminal disclaimer.

(21) Appl. No.: 17/753,205

(22) PCT Filed: Mar. 6, 2020

(86) PCT No.: PCT/IB2020/051976
§ 371 (c)(1),
(2) Date: Feb. 23, 2022

(87) PCT Pub. No.: WO2021/038305
PCT Pub. Date: Mar. 4, 2021

(65) Prior Publication Data

US 2022/0281562 A1 Sep. 8, 2022

Related U.S. Application Data

(63) Continuation of application No. 16/795,130, filed on Feb. 19, 2020, now Pat. No. 10,710,682.
(Continued)

(51) Int. Cl.
*B63B 25/14* (2006.01)
*B63B 3/48* (2006.01)
(Continued)

(52) U.S. Cl.
CPC ................ *B63B 25/14* (2013.01); *B63B 3/48* (2013.01); *B63H 5/125* (2013.01); *F17C 1/002* (2013.01);
(Continued)

(58) Field of Classification Search
CPC ........... B63B 25/00; B63B 25/14; B63B 3/00; B63B 3/48; B63H 5/00; B63H 5/125;
(Continued)

(56) References Cited

U.S. PATENT DOCUMENTS 5,031,558 A 7/1991 Davis
10,710,682 B1 * 7/2020 Mermiris ................ B63B 25/14

FOREIGN PATENT DOCUMENTS

CN 102781772 A 11/2012
CN 106163913 A 11/2016
(Continued)

OTHER PUBLICATIONS

Search Report and Written Opinion issued for International Patent Application No. PCT/IB2020/051976, dated Jun. 12, 2020, 14 pages, ISA/EP.

(Continued)

*Primary Examiner* — Lars A Olson
(74) *Attorney, Agent, or Firm* — Haynes and Boone, LLP; Mark A. Tidwell

(57) ABSTRACT

A bunkering marine vessel has an elongated, multi-deck accommodation structure extending along a portion of the length of one hull side and spaced apart from a centerline extending from bow to stern. Positioned within the vessel hull is at least one LNG pressure vessel filling at least 50% of the hull volume and extending from adjacent a lowermost deck to adjacent the main deck. At least one marine gasoil tank is positioned along an opposing hull side to counter the weight of the accommodation structure, The bow and stern ends of the vessel are substantially the same in shape, and each end includes a marine propulsion system.

31 Claims, 29 Drawing Sheets

Related U.S. Application Data

(60) Provisional application No. 62/891,567, filed on Aug. 26, 2019.

(51) Int. Cl.
*B63H 5/125* (2006.01)
*F17C 1/00* (2006.01)

(52) U.S. Cl.
CPC ................ *F17C 2201/0152* (2013.01); *F17C 2221/033* (2013.01)

(58) Field of Classification Search
CPC .... F17C 1/00; F17C 1/002; F17C 2201/0152; F17C 2221/033
USPC ........................................................ 114/74 A
See application file for complete search history.

(56) References Cited

FOREIGN PATENT DOCUMENTS

| | | | |
|---|---|---|---|
| DE | 202014000942 | U1 | 4/2014 |
| KR | 20180000102 | A | 1/2018 |
| KR | 20190011564 | A | 2/2019 |
| WO | WO 2016/016647 | A1 | 2/2016 |

OTHER PUBLICATIONS

Examination Report issued for European Patent Application No. 20712692.1, dated Jan. 10, 2024, 5 pages.
Examination Report issued for Hong Kong Patent Application No. 22023067818.1, dated Feb. 9, 2024, 3 pages.

* cited by examiner

BUNKERING MARINE VESSEL

PRIORITY CLAIM

The present application is a U.S. National Stage Patent Application of International Patent Application No. PCT/IB2020/051976, filed on Mar. 6, 2020, which claims priority to U.S. Non-Provisional application Ser. No. 16/795,130, filed Feb. 19, 2020, which claims the benefit of priority to U.S. Provisional Application No. 62/891,567, filed Aug. 26, 2019, the benefits of which are claimed and the disclosures of which are incorporated by reference in their entireties.

FIELD OF THE INVENTION

The present disclosure generally relates to ship to ship delivery of fuel, and more particularly to a fuel bunkering vessel that can readily be moored to much larger ships.

BACKGROUND OF THE INVENTION

In the maritime industry, it may be necessary to deliver fuel between ships. Often, this may be at sea or in waters that are turbulent. As the fuel delivery ship is moored to the ship to which fuel is being transferred, fenders are deployed between the ships to absorb kinetic energy of the two ships resulting from relative movement of the ships, thereby preventing damage to the moored ships. In many cases, the fuel delivery ship is significantly smaller than the recipient ship. More specifically, the recipient ship may be many decks taller and significantly longer than the fuel delivery ship. For example, larger cruise ships or cargo ships may be 70 meters above the water line or 6 or more decks taller than the adjacent fuel delivery ship. Thus, while the larger recipient ship may remain stable in turbulent water, the smaller fuel delivery ship may rock significantly. This rocking can result in a portion of the vertical profile of the fuel delivery ship colliding with the larger ship as the smaller ship rolls and pitches alongside the larger ship. This concern becomes even more acute when the lager ship has equipment overhanging the side of the larger ship, such as life boats. In many cases, the vertical profile of a ship above the main deck consists of the accommodation block or superstructure of the vessel, which is an enclosed structure that typically includes the bridge (or wheelhouse), the crew quarters (such as crew cabins, dining facilities and medical facilities) and machinery related to the bridge and crew quarters, such as heating, ventilation and air conditioning (HVAC) equipment and storage. Traditionally, the accommodation block is positioned on the main or top deck and extends symmetrically between port and starboard sides of the vessel, either at the bow or the stern of the vessel so as to be spaced apart from amidships. To reduce the likelihood of contact between a high profile of a fuel delivery ship and the larger ship to which it is delivering fuel, a low-profile barge is often moored between the fender and the fuel delivery ship, so the fuel delivery ship "stands off" from the larger ship.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. Embodiments are described in detail hereinafter with reference to the accompanying figures, in which.

DETAILED DESCRIPTION OF THE DISCLOSURE

Figure 1:
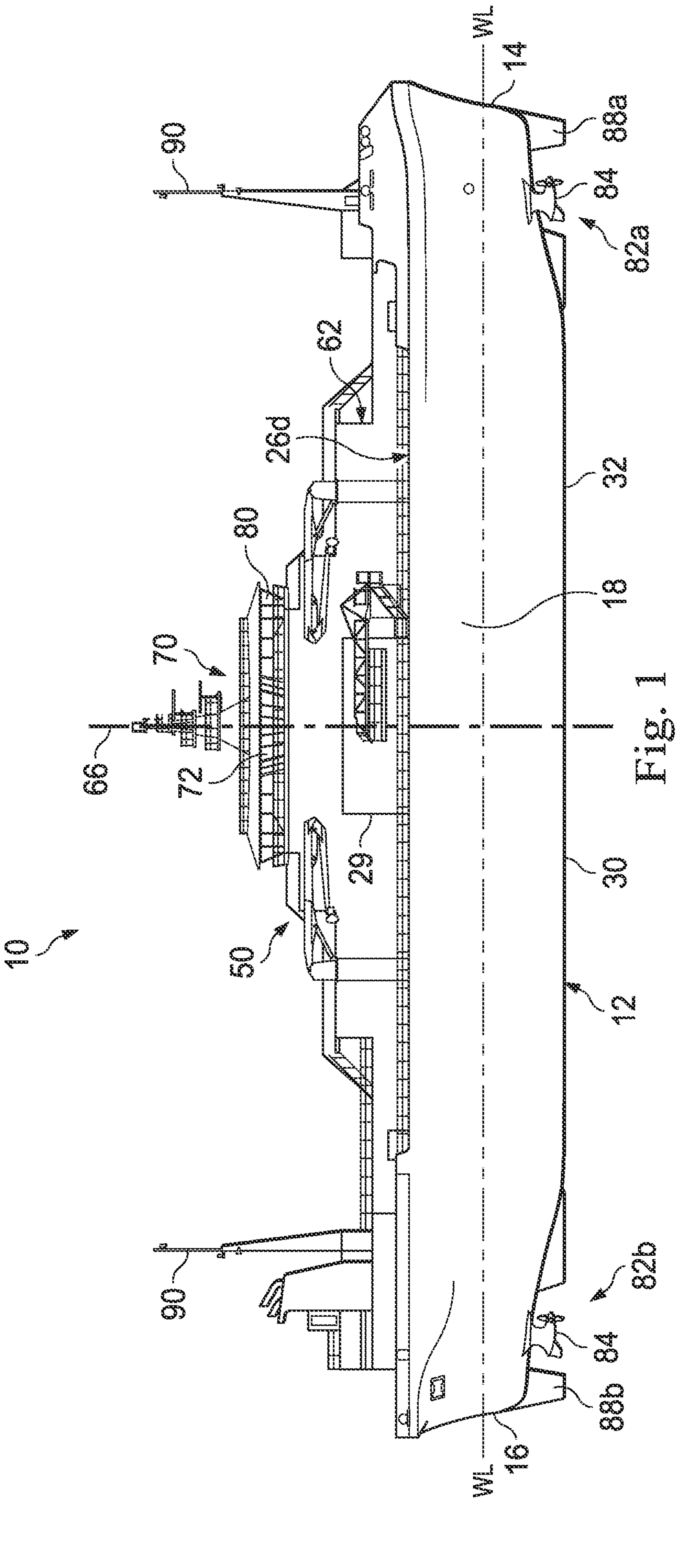
FIG. 1 is an elevation view of the bunkering side of a fuel bunkering vessel with an accommodation structure extending along an opposite side of the fuel bunkering vessel.

With reference to FIG. I, a side elevation view of a bunkering marine vessel 10 is shown. Bunkering marine vessel 10 includes an elongated hull 12 having a first or bow end 14 and a second or stern end 16. Hull 12 is formed of a substantially vertical first hull side 18. In the Figure, first hull side 18 is the starboard side of bunkering marine vessel 10. The bottom 30 of hull 12 extending between the first end 14 and the second end 16 is shown as having a keel 32. The hull 12 includes a plurality of hull decks 26, including an orlop deck, which is the lowermost or lowest full deck of the hull 12, and a main deck, which is the highest full deck of the hull 12. In the illustrated embodiment of FIG. 1, the highest full deck is shown as deck 26*d.* An elongated, multi-deck accommodation structure 50 is generally formed adjacent main deck 26*d* and extends lengthwise adjacent main deck 26*d.* More specifically, the accommodation structure 50 is positioned adjacent main deck 26*d* to be substantially equidistance from each of the two hull ends 14, 16 so that the weight of the accommodation structure 50 is substantially balanced about an amidships plane 66 equidistance between the two hull ends 14, 16, and perpendicular to the hull side 18. In other words, the accommodation structure 50 is substantially symmetrical about the amidships plane 66. straddling the plane 66 so as to be equidistance between the two hull ends 14, 16.

The accommodation structure 50 preferably includes at least two full decks 68 (see FIG, 3) enclosed by an enclosure 62, with a bridge 70 at the top of the accommodation structure 50. In one or more embodiments, a wheelhouse 72 may extend from the bridge 70 with windows 80 wrapping around at least a portion of bridge 70. In one or more embodiments, a masthead 90 may be positioned near one or both ends 14, 16 of hull 12, where each masthead 90 is spaced apart from the accommodation structure 50.

A first marine propulsion system 82*a* is positioned adjacent the keel 32 at the first end 14 of the hull 12 and a second marine propulsion system 82*b* is positioned adjacent the keel 32 at the second end 16 of the hull 12, The marine propulsion system 82 may include a propeller, water jet or other thruster 84. In one or more embodiments, each marine propulsion system 82 may he disposed to swivel at least 270 degrees on a thruster axis 86, while in other embodiments, each first marine propulsion system 82 may swivel 360 degrees on the thruster axis 86. In one or more embodiments, two marine propulsion systems 82 are provided at each end 14, 16 of the hull 12, spaced apart from one another on either side of the keel 32. In one or more embodiments, a seakeeping hull appendage 88 may be positioned adjacent each marine propulsion system. In the illustrated embodiment, at least one seakeeping hull appendage 88 is positioned adjacent each end 14, 16 of the hull 12, spaced outwardly from the marine propulsion system 82 on that end. It will be appreciated that having a thruster 84 positioned adjacent each end 14, 16 of hull 12 and each capable of swiveling at least 270 degrees can function as a dynamic position system, allowing bunkering marine vessel 10 to perform bunkering operations without the use of fenders and ropes.

For embodiments where bunkering marine vessel 10 is disposed for carrying LNG as the bunkering fuel, bunkering marine vessel 10 may include a reliquification equipment 29.

Figure 2:
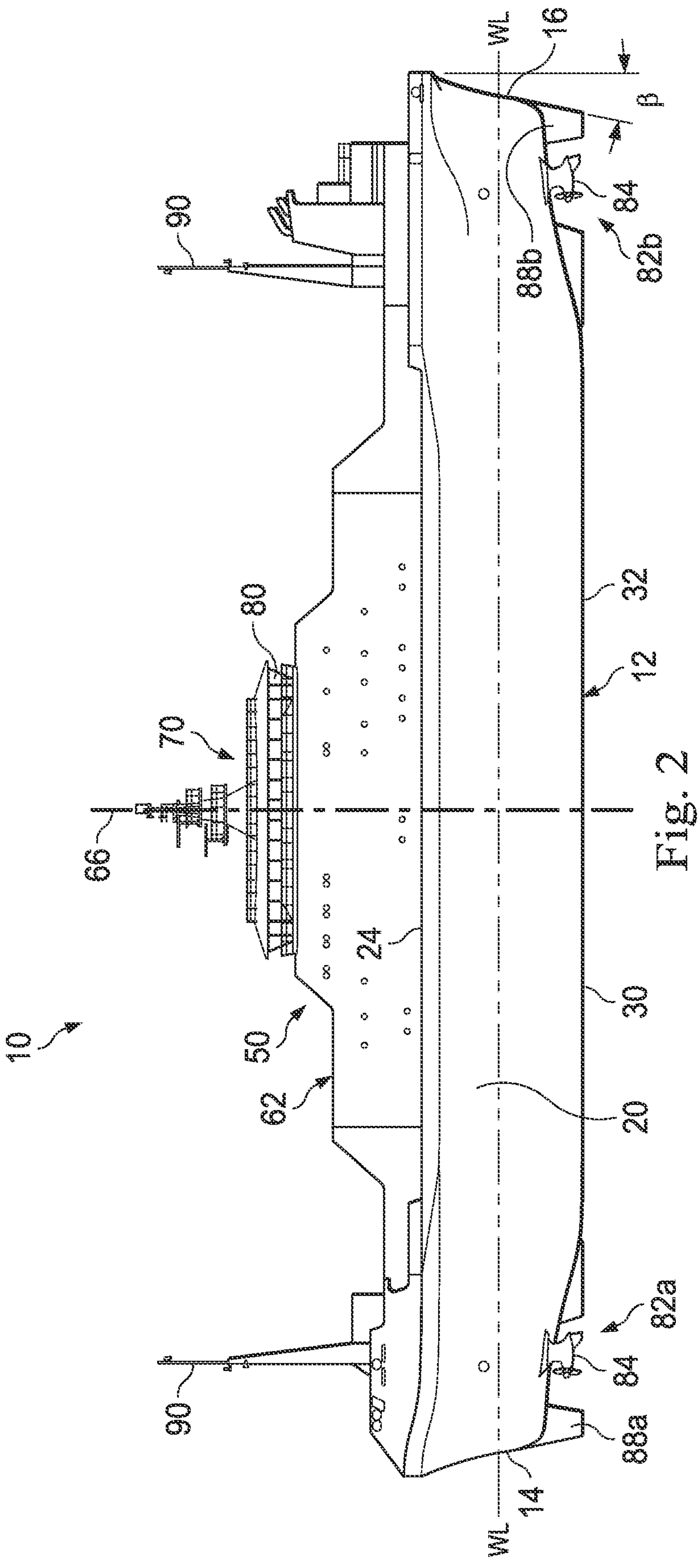
FIG. 2 is an elevation view of the accommodation structure side of the fuel bunkering vessel of FIG. 1.

Turning to FIG. 2, a side elevation view of a bunkering marine vessel 10 illustrates accommodation structure 50 extending along substantially vertical second side 20 of hull 12. In particular, second hull side 20 terminates in an upper side edge 24 and accommodation structure 50 extends along the length of at least a portion of side edge 24. In one or more embodiments, accommodation structure 50 extends for at least 15% of the length of second hull side 20 between the two hull ends 14, 16. in one or more embodiments, accommodation structure 50 extends for at least 25% of the length of second hull side 20 between the two hull ends 14, 16. In one or more embodiments, accommodation structure 50 extends for at least 50% of the length of second hull side 20 between the two hull ends 14, 16.

in one or more embodiments, the outer hull ends 14, 16 of vessel 10, and in particular, the outer shape of the first hull end or bow 14 and the outer shape of the second hull end or stern 16, is substantially the same at least at or below the waterline (WL), regardless of the outer shape selected for the two hull ends 14, 16. Thus, the hull outer shape at the first and second hull ends 14, 16 adjacent at least the first and second hull decks 26*a,* 26*b* is the same shape (see FIGS. 12 and 13). In some embodiments, the first and second hull ends 14, 16 adjacent at least the first, second and third hull decks 26*a,* 26*b,* 26*c* is the same shape (see FIGS. 11*a,* 12 and 13). In this regard, the first and second hull ends 14, 16 may have any shape, including without limitation, a bulbous bow, a plumb bow, a curved bow, and inverted bow, a raked bow or a strait bow, among others, such that the lower portion of hull 12 is substantially symmetrical about amidships plane 66. Thus, in some embodiments, the hull ends 14, 16 have substantially the same deadrise angle. Likewise, in some embodiments, the first and second ends 14, 16 may have a similar rake angle $\beta$ and a similar parabolic. In some embodiments, the rake angle $\beta$ is between 0-15 degrees. In some embodiments, the rake angle $\beta$ is approximately 12 degrees. In some embodiments, the rake angle $\beta$ is less than 30 degrees. In some embodiments, the rake angle $\beta$ is less than 20 degrees. In some embodiments, the rake angle $\beta$ is less than 10 degrees, it will be appreciated that while the lower portions of the outer hull ends 14, 16 of vessel 10 are of substantially the same shape, the upper portions of the outer hull ends 14, 16 of vessel 10, especially adjacent the main deck 26*d,* as well as the main deck 26*d,* may have different shapes and configurations.

Figure 3:
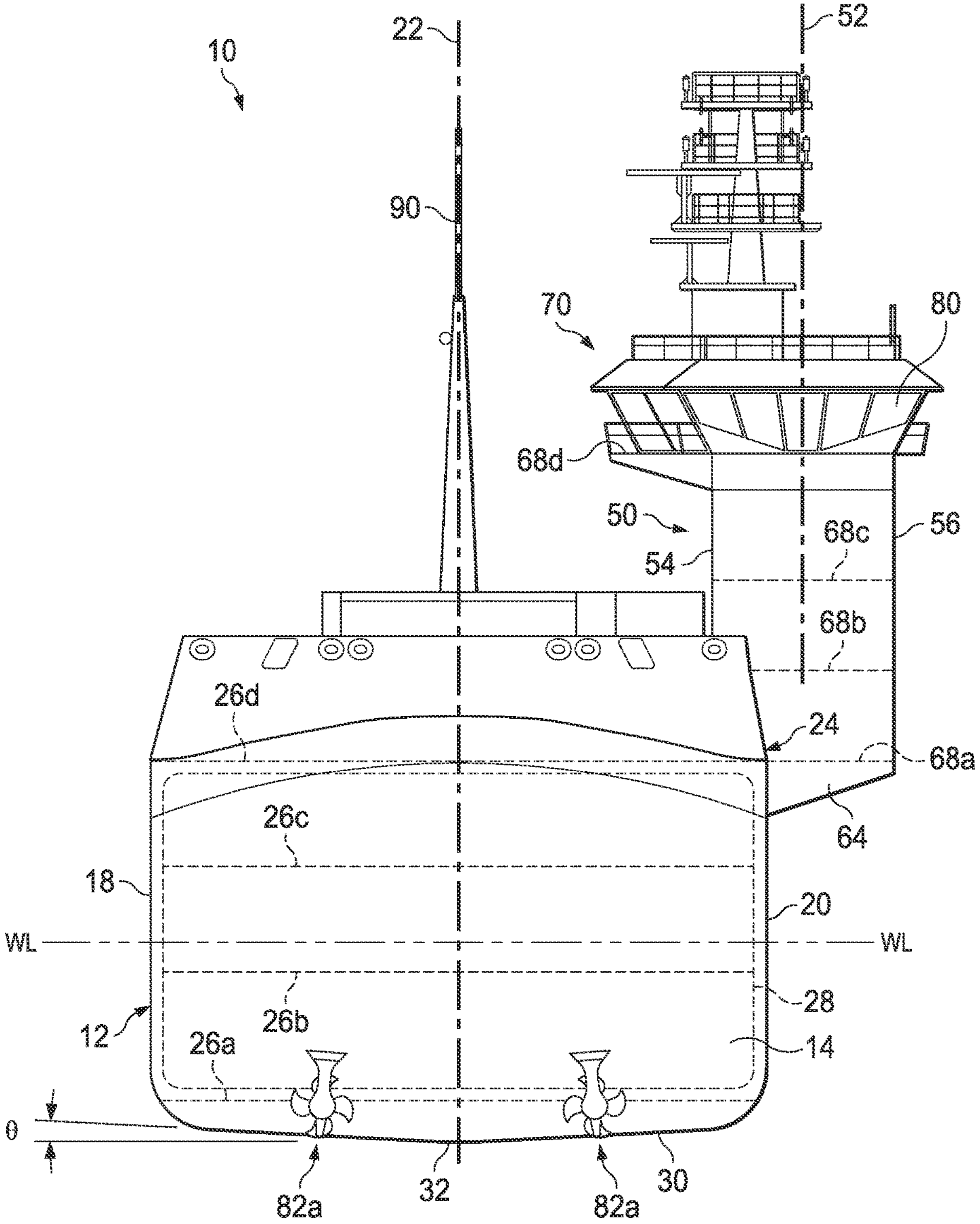
FIG. 3 is an elevation end view of the bow of the fuel bunkering vessel of FIG. 1.

Turning to FIG. 3, an elevation view of the bow end 14 of the fuel bunkering vessel 10 better illustrates the positioning of accommodation structure 50 along the second side 20 of hull 12. As shown, substantially vertical first and second hull sides 18, 20, respectively, are spaced apart from a substantially vertical centerline plane 22 extending between the first and second hull ends 14, 16. With the accommodation structure 50 positioned along second side 20, it will be understood that first side 18 is the "bunkering side" of fuel bunkering vessel 10. Accommodation structure is 50 is generally formed about a main axis 52. a substantial portion of the accommodation structure 50 being is spaced apart from the centerline plane 22, positioned adjacent the edge 24 of the second hull side 20 and extending along a portion of the edge 24 of the second hull side 20 between the two hull ends 14, 16 (see FIG. 2). Accommodation structure 50 has a first elongated exterior side 54 which faces the first hull side 18 and is generally parallel with but spaced apart from the centerline plane 22. Accommodation structure 50 further has a second elongated exterior side 56 which is positioned beyond the edge 24 of second hulls side 20. In one or more embodiments, the accommodation structure 50 is positioned on the main deck 26*d* adjacent the intersection of the main deck 26*d* and the second hull side 20, while in other embodiments, the accommodation structure 50 is positioned above the main deck 26*d*. In one or more embodiments, a substantial portion of the accommodation structure 50, and in particular first exterior side 54, is positioned spaced away from the centerline plane 22 and does not cross the centerline plane 22. In one or more embodiments, a substantial portion of the length of the accommodation structure 50 extends beyond main deck 26*d*, past edge 24 of second hull side 20 and out over the second side 20 of the hull 12 so as to be cantilevered with respect to the second side 20 of the hull 12. In one or more embodiments, at least twenty five percent (25%) of the enclosed volume of the accommodation structure 50 extends beyond main deck 26*d*, past edge 24 of second hull side 20 and out over the second side 20 of the hull 12 so as to be cantilevered with respect to the second side 20 of the hull 12, In one or more embodiments, at least fifty percent (50%) or more of the enclosed volume of the accommodation structure 50 extends beyond main deck 26*d*, past edge 24 of second hull side 20 and out over the second side 20 of the hull 12 so as to be cantilevered with respect to the second side 20 of the hull 12. Of course, persons of skill in the art will appreciate that the percent volume (if any) of accommodation structure 50 that extends beyond main deck 26*d*, past edge 24 of second hull side 20 and out over the second side 20 of the hull 12 depends in part on the width of the main deck 26*d* and the width of accommodation structure 50 between the first and second exterior sides 54, 56. In some embodiments, the width of main deck 26*d* may be sufficiently wide that accommodation structure 50 may extend along second hull side 20 without overhanging second hull side 20, although in all cases, accommodation structure 50 generally, and first exterior side 54 specifically, are spaced apart from centerline plane 22 as described herein. Thus, in one or more embodiments, accommodation structure 50 generally, and first exterior side 54 specifically, are spaced apart from centerline plane 22 as described herein with the second exterior side 56 of accommodation structure 50 being positioned between the first exterior side 54 and the edge 24 of second hull side 20 as opposed to extending above edge 24 or otherwise overlying edge 24. In any event, an accommodation support structure 64 may extend from the hull 12 or main deck 26*d* and support the accommodation structure 50.

As shown, masthead(s) 90 is shown to be positioned along centerline plane 22 and as such, is spaced apart from accommodation structure 50.

In one or more embodiments, the bottom 30 of the hull 12 extending between the two hull sides 18, 20 is substantially flat with little or no deadrise. In some embodiments, the deadrise angle θ is between 0-10 degrees. In some embodiments, the deadrise angle θ is less than 30 degrees. In some embodiments, the deadrise angle θ is less than 20 degrees. In some embodiments, the deadrise angle θ is less than 10 degrees. In one or more embodiments, the maximum draft is approximately 8.00 m, while in other embodiments, the maximum draft is no more than approximately 12.00 m.

As stated above, hull 12 includes a plurality of vertically spaced apart hull decks 26 (shown in dashed), including an orlop deck, which is the lowermost or lowest full deck of the hull 12, and a main deck, which is the highest full deck of the hull 12. Although the disclosure is not limited to the number of full hull decks, in the illustrated embodiment, hull 12 has 4 full, vertically spaced apart hull decks 26*a*-26*d* numbered decks 1-4 with deck 1 being the orlop deck 26*a* and deck 4 being the main deck 26*d*. The main deck 26*d* extends between the two hull sides 18, 20 to define a hull interior 27 having a volume 28 within the hull 12, the hull interior 27 and volume 28 defined by the main deck 26*d*, the lowermost deck 26*a*, the hull sides 18, 20 and the hull ends 14, 16. As described herein with respect to decks 26, it is understood that the decks are vertically spaced apart within hull 12 so as to be above or below the other decks 26.

Likewise, as stated above, the accommodation structure 50 preferably includes at least two full, vertically spaced apart, enclosed decks 68, with a bridge deck 68*d* and a bridge 70 mounted on top of the accommodation structure 50. In one or more embodiments, the lowest deck 68*a* of the accommodation structure. 50 may be the same as the main deck 26*d* of hull 12, In some embodiments, main deck 26*d* of hull 12 may extend beyond the second hull side 20 to form the lowest accommodation structure deck 68*a*. In other embodiments, the lowest accommodation structure deck 68 may be raised above or otherwise separate from the main deck 26*d*, In one or more embodiments such as shown in the Figures, the accommodation structure 50 includes at least three decks 68*a*, 68*b*, 68*c*. The accommodation structure decks 68 are not limited to a particular purpose and may include without limitation, among other things, command and control, communications, radar, crew cabins, HVAC equipment, galley, mess, storage, machinery and water purification. As described herein with respect to decks 68, it is understood that the decks within accommodation structure 50 are vertically spaced apart so as to be above or below the other decks 68.

Figure 4:
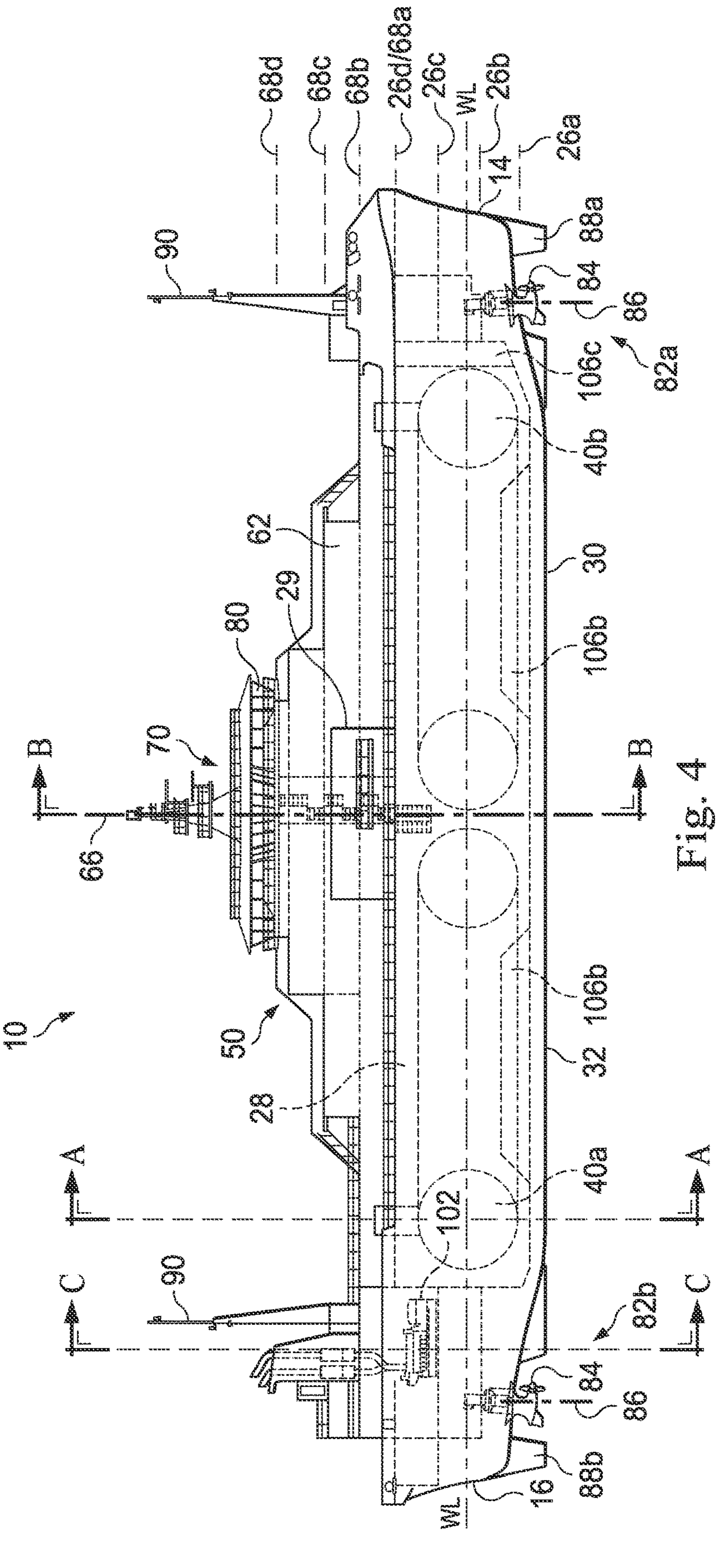
FIG. 4 is a side view of the bunkering side of the fuel bunkering vessel of FIG. 1 illustrating deck and bunkering fuel storage tank positioning within the hull of the fuel bunkering vessel.

With reference to FIG. 4, hull interior 27 is illustrated more specifically with reference to hull decks 26*a*-26*d*. At least one primary or main bunkering fuel storage tank 40 extends between the first and second sides 18, 20 of the hull 12. In some embodiments, such as the illustrated embodiment, two or more primary or main bunkering fuel storage tanks 40*a*, 40*b* are positioned within the hull 12 along the centerline plane 22 and between the two hull ends 14, 16, while in other embodiments, three or more primary or main hunkering fuel storage tanks 40*a*, 40*b*, 40*c* (see FIG. 17) are positioned within the hull 12 along the centerline plane 22 and between the two hull ends 14, 16, in still yet other embodiments, four or more primary or main bunkering fuel storage tanks are positioned within the hull 12 along the centerline plane 22 and between the two hull ends 14, 16. In any of these embodiments, main bunkering fuel storage tank 40 may be symmetrically positioned within the hull 12 along the centerline plane 22 (see FIG. 3) and between the two hull ends 14, 16. As used herein, bunkering fuel storage tank refers to a tank for storing any type of ship fuel, and is not limited to a particular type of ship fuel storage, with the bunkering fuel storage tank(s) having significant fluid storage volume. In one or more embodiments, bunkering fuel storage tank 40 is a liquified natural gas (LNG) storage tank. In one or more embodiments, the bunkering fuel storage tank(s) 40 are positioned on the lowest deck 26*a* and extend upwards at least two decks above the lowest deck 26*a* towards the main deck 26*d*. In some embodiments, the primary or main bunkering fuel storage tanks 40 extend from the lowest deck 26*a* to a height just below the main deck 26*d*. In one or more embodiments, the bunkering fuel storage tank(s) 40 extend from a lowermost deck 26*a* to a height adjacent the main deck 26*d*. In one or more embodiments, the hunkering fuel storage tank(s) 40 extend from a lowermost deck 26*a* to a height of at least two decks above the lowermost deck 26*a*. In one or more embodiments, the bunkering fuel storage tank(s) 40 extend from a lowermost deck 26*a* to a height of at least one decks above the lowermost deck 26*a,* in some embodiments, main bunkering fuel storage tank(s) 40 may extend from a lower deck through main deck 26*d* and above the surface of main deck 26*d.*

In one or more embodiments, the bunkering fuel storage tank(s) 40 extend from adjacent the first hull side 18 across the centerline plane 22 to adjacent the second hull side 20. In one or more embodiments, the bunkering fuel storage tank(s) 40 extend from adjacent the first hull end 14 to adjacent the second hull end 16. It will be appreciated that the primary or main bunkering fuel storage tanks 40, therefore, fill a substantial amount of the volume 28 of the hull 12 below the main or upper deck 26*d,* In one or more embodiments, bunkering fuel storage tank(s) fill up a significant portion of the volume 28 of the hull 12 between the lowest deck 26*a* and the main deck 26*d.* In a non-limiting example, in some embodiments, primary or main bunkering fuel storage tanks 40 fill at least 30 percent of the volume 28 of the hull 12, while in other embodiments, primary or main bunkering fuel storage tanks fill 40 at least 30-50 percent of the volume 28 of the hull 12, while in other embodiments, primary or main bunkering fuel storage tanks 40 fill more than 50 percent of the volume 28 of the hull 12. Thus, it will be appreciated that bunkering fuel storage tank 40 have a significant volume as compared to fuel storage tanks for fueling vessel 10. In the illustrated embodiment, each of bunkering fuel storage tanks 40*a,* 40*b* are approximately 3750 $m^3$ for an overall total volume of approximately 7500 $m^3$ for bunkering fuel volume. However, the foregoing capacities are for illustrative purposes only. It will be appreciated, however, that in one or more embodiments, it is preferable that the capacities of bunkering fuel storage tanks 40*a,* 40*b* are substantially the same to ensure an even weight distribution about amidships plane 66. In one or more embodiments, the overall total bunkering fuel volume is at least 2500 $m^3$ while in other embodiments, the overall total bunkering fuel volume is at least 5000 $m^3$.

In addition to bunkering fuel storage tanks 40, vessel 10 also may include additional cargo tanks 106. Cargo tanks 106 may be any liquid fluid tank. In one or more embodiments, cargo tanks 106 may be water ballast tanks. In other embodiments, cargo tanks 106 may be fuel cargo tanks utilized to provide fuel for vessel 10. In some embodiments, cargo tanks 106 are marine gasoil (MGO) tanks. In the illustrated embodiment, a cargo tank 106*b* is show positioned on deck 26*a* along centerline plane 22 below each bunkering fuel storage tank 40. In addition, cargo tank 106*c* is shown forward of bunkering fuel storage tanks 40*b* at the bow end 14 of vessel 10. In some embodiments, cargo tank 106*c* may extend through two or more decks. In the illustrated embodiment, cargo tank 106*c* extends through mid-decks 26*b* and 26*c* to just below main deck 26*d.* In non-limiting examples, primarily as a point of comparison to the volume of the bunkering fuel storage tanks 40, each cargo tank 106*b* may have a volume of approximately 155 $m^3$, while each cargo tank 106*c* may have a volume of approximately 110 $m^3$.

For embodiments where bunkering marine vessel 10 is disposed for carrying LNG as the bunkering fuel, bunkering marine vessel 10 may include a reliquification equipment 29, such as is illustrated on shown on deck 4 or main deck 26*d* in the Figures.

The bunkering marine vessel 10 includes at least one engine 102 for driving a propulsion system 82. Without limiting the foregoing, the engines 102 may be marine diesel engines as are well known in the industry, while in other embodiments, the engines may be other types of engines.

Figure 5:
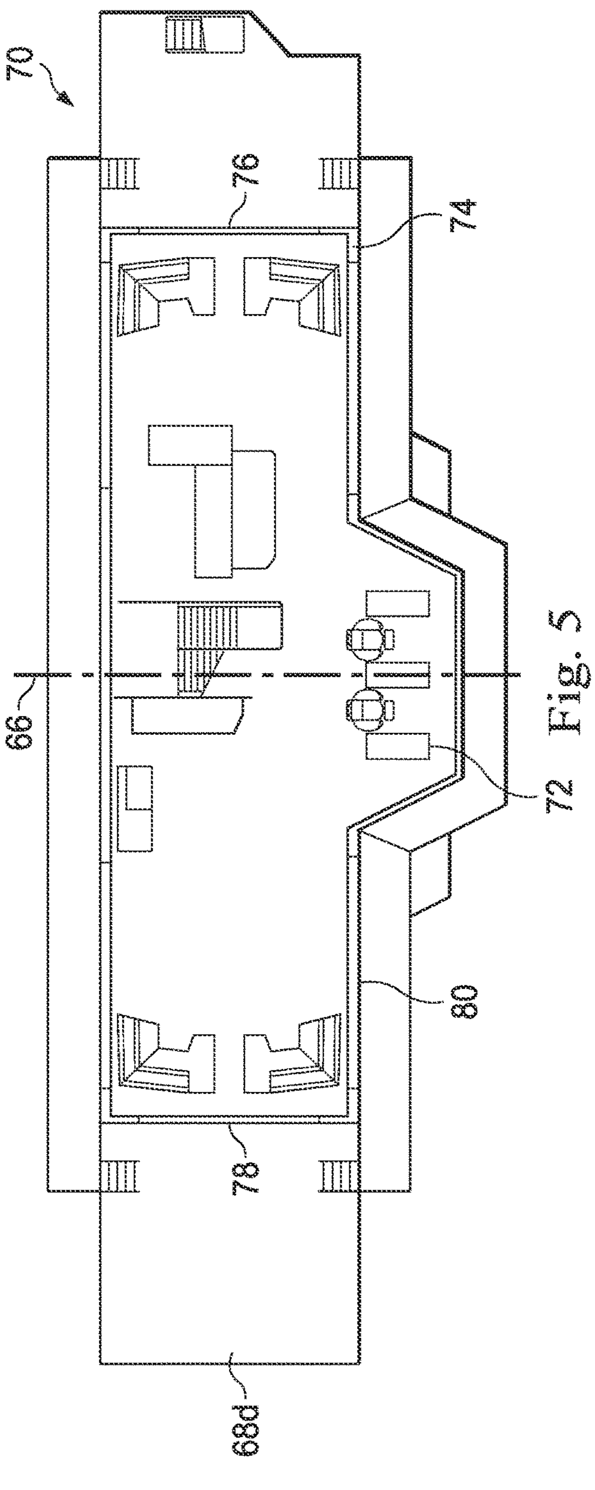
FIG. 5 is a plan view of the bridge deck of the accommodation structure.

With reference to FIG. 5, the bridge deck 68*d* and bridge 70 are illustrated. As used herein, a bridge refers to a structure mounted on a bridge deck which is enclosed by one or more exterior walls. In one or more embodiments, a wheelhouse 72 may extend from the bridge 70 out towards the first side 18 of the hull 12 (see FIG. 3), In one or more embodiments, the bridge 70 includes an elongated bridge wall 74 that is substantially parallel with the first hull side 18, a bow wall 76 extending from one end of the elongated bridge wall 74 and a stem wall 78 extending from the other end of the elongated bridge wall 74. In one or more embodiments, windows 80 extend substantially the full length of the walls 74, 76, 78 of the bridge 70, thereby permitting a full, unobstructed view of the main deck 26*d* of the hull 12.

Figure 6A:
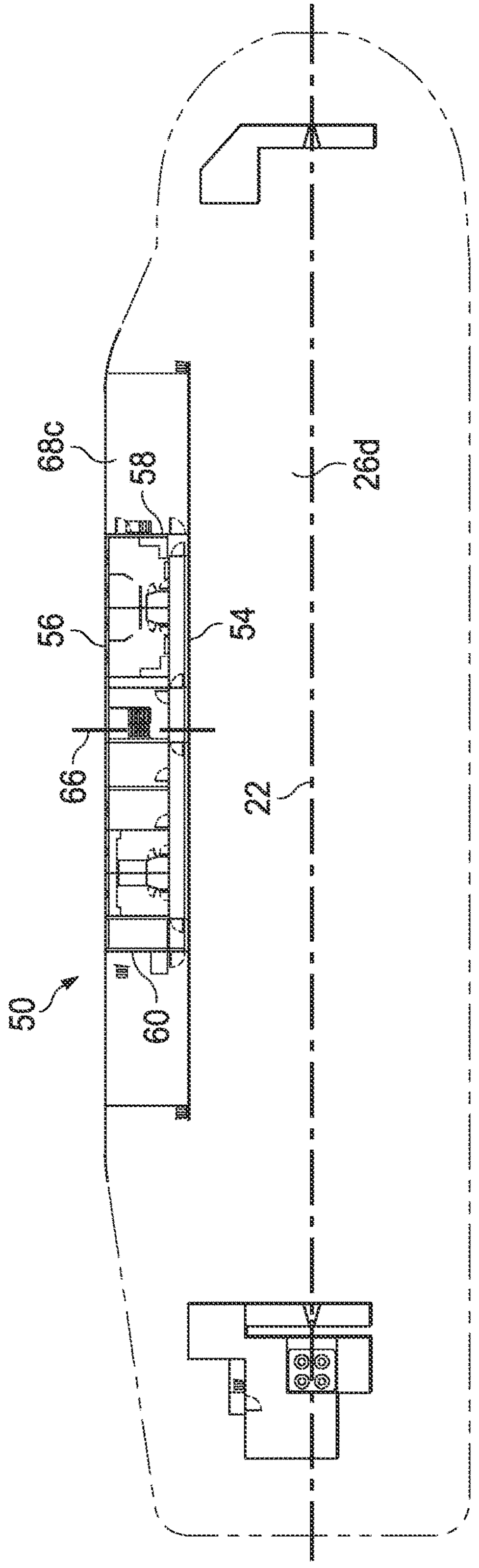
FIGS. 6*a* and 6*b* are plan views of an upper mid-deck of the accommodation structure extending along a side of a filet bunkering vessel.
Figure 6B:
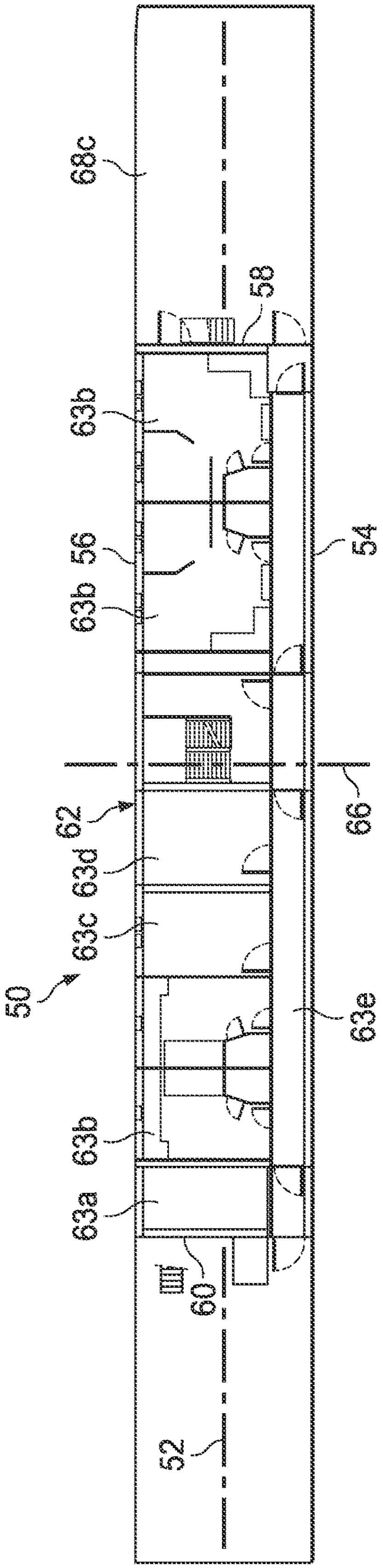

Turning to FIGS. 6*a* and 6*b,* mid-deck 68*c* of accommodation structure 50 is illustrated more specifically. As noted above, accommodation structure 50 is a multi-deck structure that rises above the main deck 26*d* of bunkering vessel 10 with at least a portion of the accommodation structure 50 being fully enclosed. In one or more embodiments, at least a portion of a plurality of accommodation structure decks 68 are fully enclosed to form various interior spaces 63. As used herein, a fully enclosed refers to a structure that is generally enclosed by one or more exterior walls. Thus, in FIG. 6*b,* the portion of accommodation structure 50 on mid-deck 68*c* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. In the illustrated embodiments, interior spaces 63 may include a store 63*a,* officer quarters 63*b,* offices 63*c,* instrument room 63*d* and an accommodation corridor 63*e.*

Figure 7A:
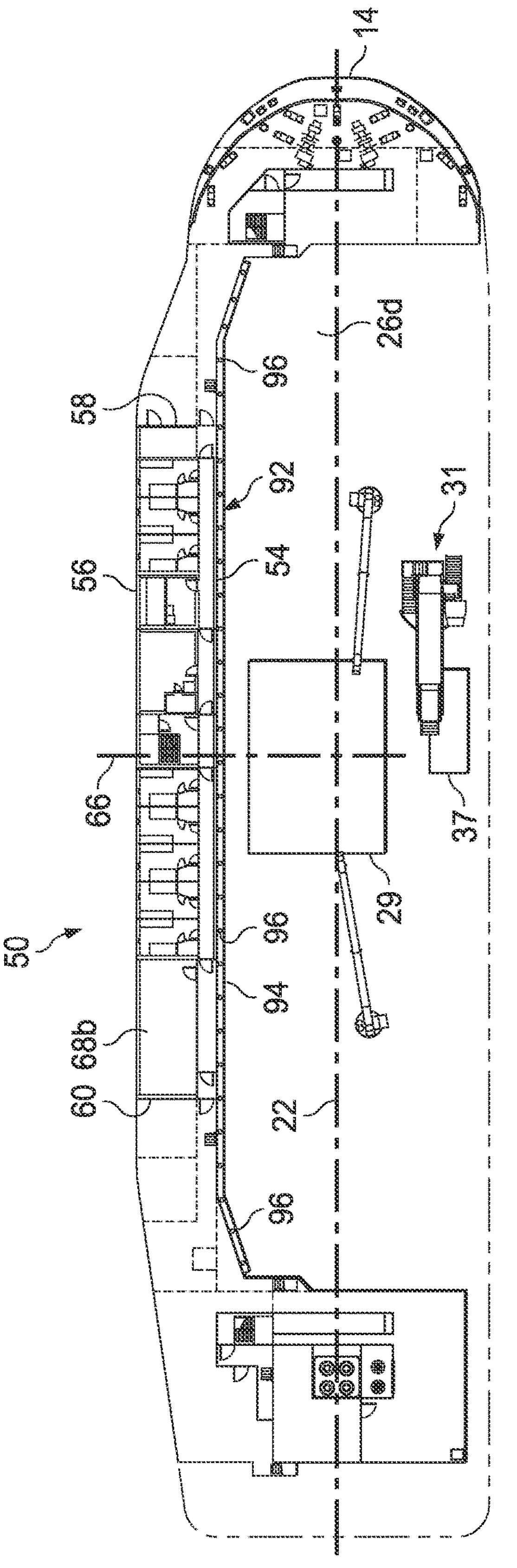
FIGS. 7*a* and 7*b* are plan views of a lower mid-deck of the accommodation structure extending along a side of a fuel bunkering vessel.
Figure 7B:
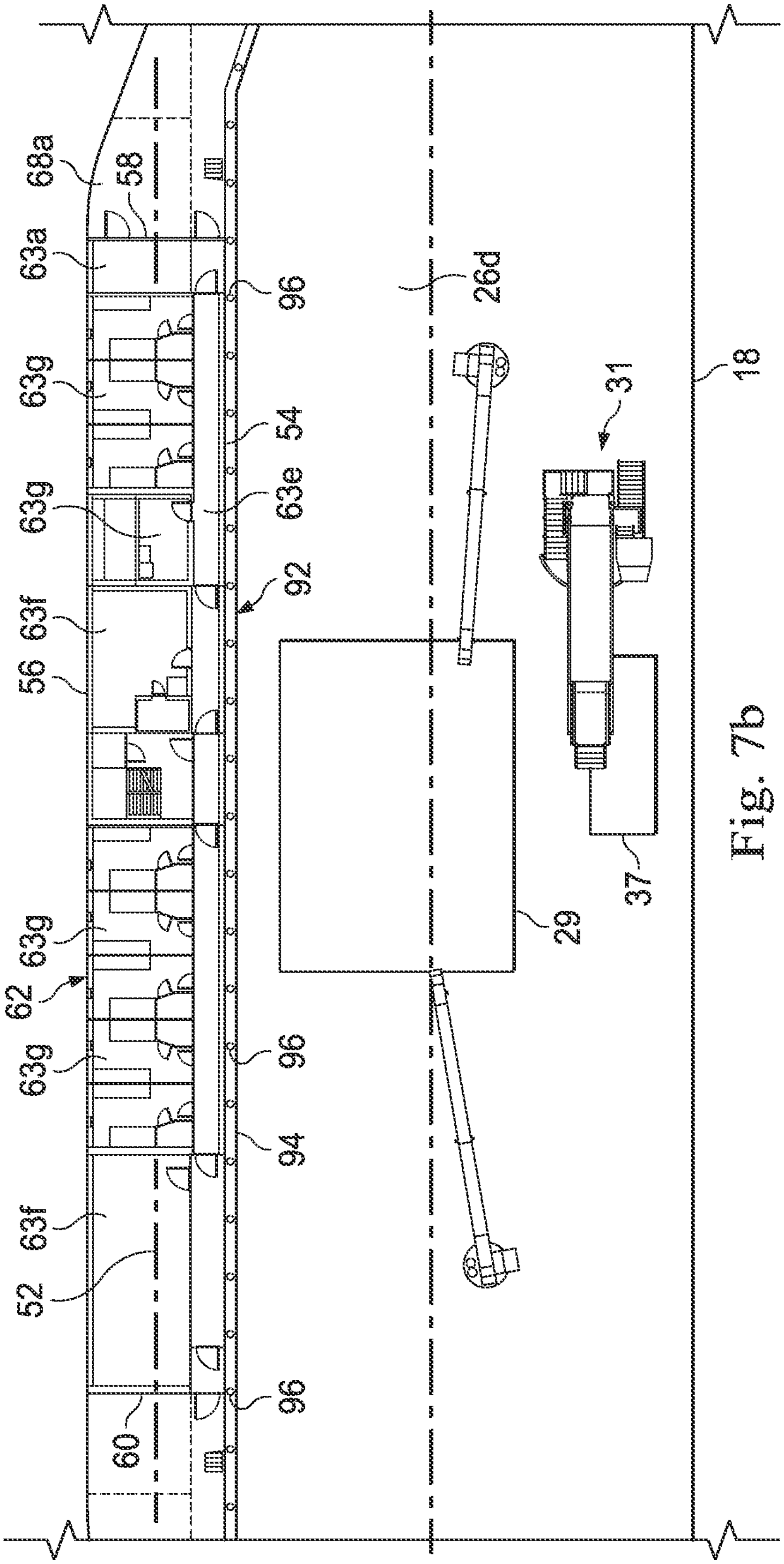

Turning to FIGS. 7*a* and 7*b,* mid-deck 68*b* of accommodation structure 50 is illustrated more specifically. In one or more embodiments, at least a portion of mid-deck 6*b* is fully enclosed to form various interior spaces 63, Accommodation structure 50 on mid-deck 68*b* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. In the illustrated embodiments, interior spaces 63 may include store 63*a,* accommodation corridor 63*e,* an HVAC room 63*f,* crew quarters 63*g* and activity room 63*f.*

Also shown in FIGS. 7*a* and 7*b* is reliquification equipment 29 positioned on main deck 26*d.* Persons of skill in the art will appreciate that while reliquification equipment 29 is shown on main deck 26*d,* in other embodiments, such equipment 29 may be located on other decks of vessel 10. In addition, a bunker station .37 is shown in FIGS. 7*a* and 7*b.* In one or more embodiments, bunker station 37 is generally positioned adjacent first hull side 18 of vessel 10' since this is the side of vessel 10' that will positioned adjacent a ship to be fueled (not shown). Finally, a motion compensation gangway 31 is also shown mounted on main deck 26*d,* likewise, generally adjacent first hull side 18 to facilitate hunkering.

In one or more embodiments, as illustrated in FIGS. 7*a* and 7*b,* a fire suppression system 92 is disposed along at least a portion of the length of the accommodation structure 50. In some embodiments, the fire suppression system 92 extends along substantially the full length of the accommodation structure 50 and mounted on the accommodation structure 50 so as to be above main deck 26*d*. In some embodiments, the fire suppression system 92 extends along substantially the full length of the first or second decks 68*a*, 68*b* of the accommodation structure 50. In one or more embodiments, fire suppression system 92 is a pipe or conduit 94 extending along a portion of the length of either the accommodation structure 50 or the first or second deck 68*a*, 68*b* of the accommodation structure 50, with a plurality of nozzles 96 disposed along the pipe and directed towards the main deck 26*d*. As such, the pipe 94 is generally parallel with the centerline plane 22. Fire suppression system 92 may further include a pump 98 and reservoir 100 in fluid communication with the pipe 94, where the reservoir 100 is disposed to receive a fire suppressant fluid such as foam, a foaming agent, water or other fire suppressant fluid. It will be appreciated that because the accommodation structure 50 extends along a substantial portion of the length of the main deck 26*d* in some embodiments, then activation of a fire suppression system 92 as described herein can more rapidly cover or blanket a greater portion of the main deck 26*d* than prior art systems. In this regard, as described above, the pipe 94 of fire suppression system 92 may be elevated above the main deck 26*d* by the accommodation structure 50 or affixed to one of the decks 68 positioned above the main deck 26*d*. For example, pipe 94 may be affixed to railing extending along accommodation structure deck 68*b* or 68*c*. Thus, in some embodiments, the pipe 94 of fire suppression system 92 may be mounted along accommodation structure 50 so as to be spaced apart from the main deck 26*d* a height sufficient to allow the nozzles 96 to deploy fire suppressant across a substantial portion of the main deck 26*d* when the fire suppression system 92 is activated.

Figure 8A:
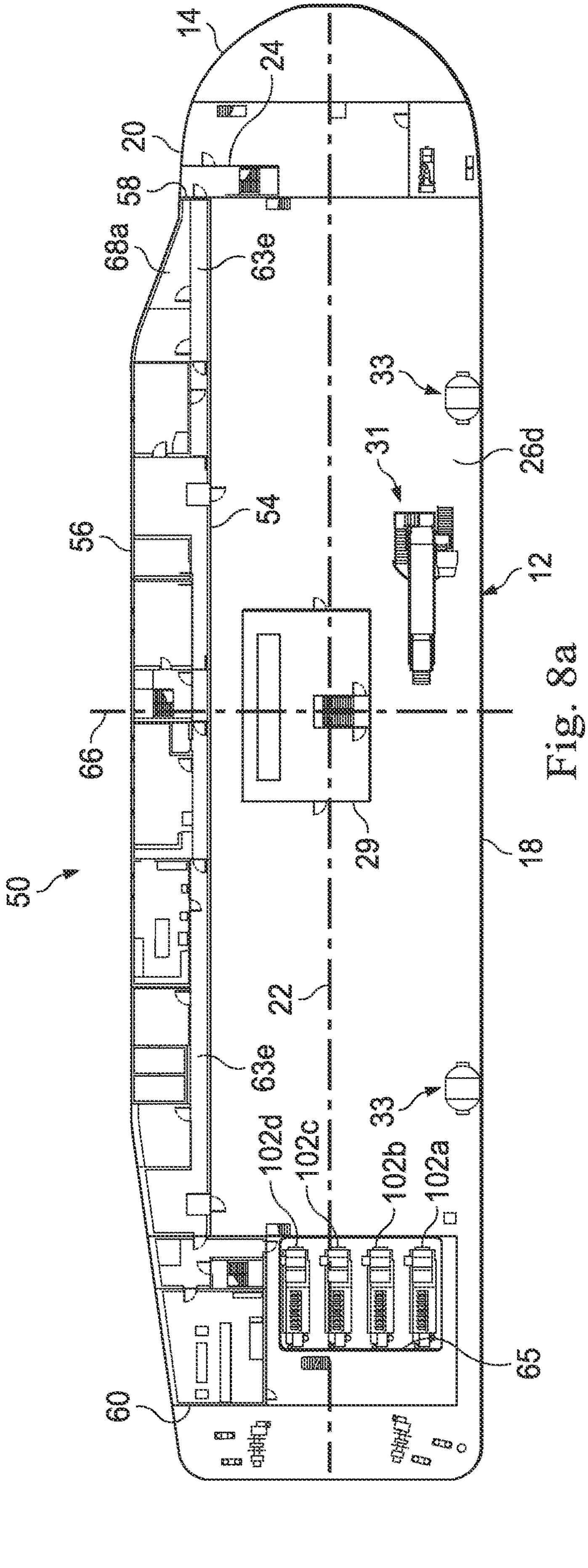
FIGS. 8*a* and 8*b* are plan views of the main vessel deck and the lower deck of the accommodation structure of a fuel bunkering vessel.
Figure 8B:
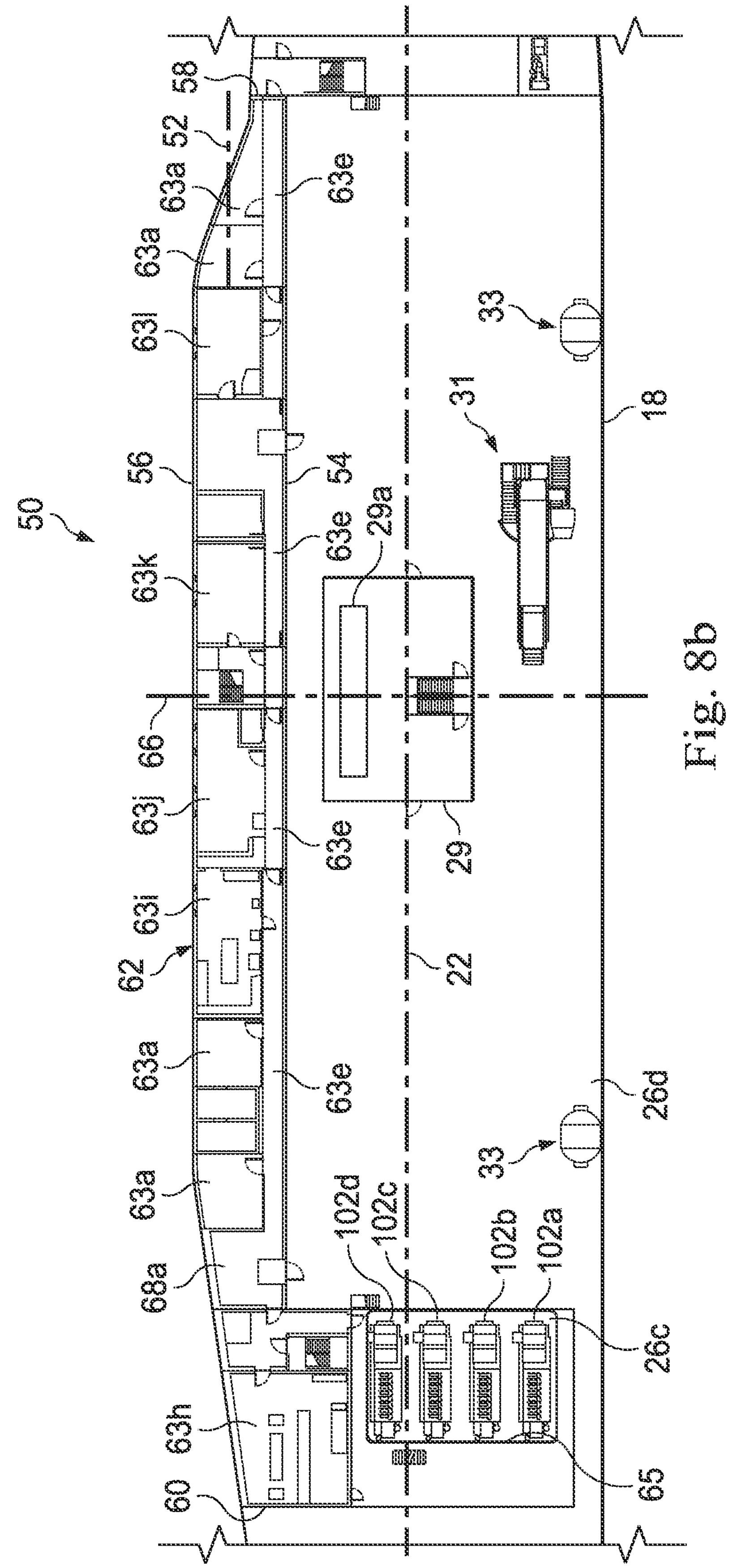

Turning to FIGS. 8*a* and 8*b*, lowest deck 68*a* of accommodation structure 50 is illustrated more specifically. In one or more embodiments, art least a portion of deck 6*a* is fully enclosed to form various interior spaces 63. Accommodation structure 50 on deck 68*a* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. In the illustrated embodiments, interior spaces 63 may include store 63*a*, accommodation corridor 63*e*, switchboard room 63*h*, galley 63*i*, messroom 63*j*, lounge 63*k* and hospital 63*l*. In one or more embodiments, as shown, the accommodation structure 50, or at least the lowest deck 68*a* of the accommodation structure 50, extends along a substantial length of the main deck 26*d* between the two hull ends 14, 16. In this illustrated embodiment, deck 68*a* extends from bow end 14 to stern end 16 to and provides an enclosed accommodation corridor 63*e* generally connecting bow end 14 to stem end 16.

Also shown in FIGS. 8*a* and 8*b* is reliquification equipment 29 positioned on main deck 26*d*. Persons of skill in the art will appreciate that while reliquification equipment 29 is shown on main deck 26*d*, in other embodiments, such equipment 29 may be located on other decks of vessel 10. Such reliquification equipment 29 may include vaporizers, compressors, heat exchangers, pumps as generally indicated by 29*a*. Again, motion compensation gangway 31 is also shown mounted on main deck 26*d*. It will be appreciated that motion compensation gangway 31 may be pivoted and raised and lowered as needed to establish a walkway or platform to an adjacent vessel (not shown).

Fenders 33 may be stored on main deck 26*d*.

Finally, FIGS. 8*a*, 8*b* illustrated that main deck 26*d* may include an opening 65 permitting access to engine(s) 102 positioned on lower deck 26*c*. In one or more embodiments, the bunkering marine vessel 10 includes at least two or more engines 102 for driving propulsion systems, while in other embodiments, the bunkering marine vessel 10 includes at least three or more engines 102 for driving propulsion systems. In the illustrated embodiment, four engines 102*a*, 102*b*, 102*c*, 102*d* are depicted. In some embodiments, an engine 102 is provided for each propulsion system 82. In one or more embodiments, to compensate for the weight of the accommodation structure 50 being positioned along the second hull side 20 of the vessel 10, the engines 102 may be positioned asymmetrically about the centerline plane 22 so as to be closer to the first hull side 18 of the vessel 10. Thus, in some embodiments with only one engine 102, the engine 102 would be positioned on a deck between the centerline plane 22 and the first hull side 18. In the illustrated embodiment with four engines, first and second engines 102*a*, 102*b* are positioned between the centerline plane 22 and the first hull side 18 with a third engine 102*c* positioned on the centerline plane 22. In the embodiment, the third engine 102*c* is asymmetrically divided by the centerline plane 22 so as to be nearer the first hull side 18 than the second hull side 20. Only the fourth engine 102*d* is positioned between the centerline plane 22 and the second hull side 20, it will be appreciated that the foregoing description is based on engines 102 of approximately the same size and weight, and the positioning as described is to ensure that a greater amount of the total weight of the engines 102 is distributed asymmetrically about the centerline plane 22 so as to be closer to the first hull side 18.

Figure 9:
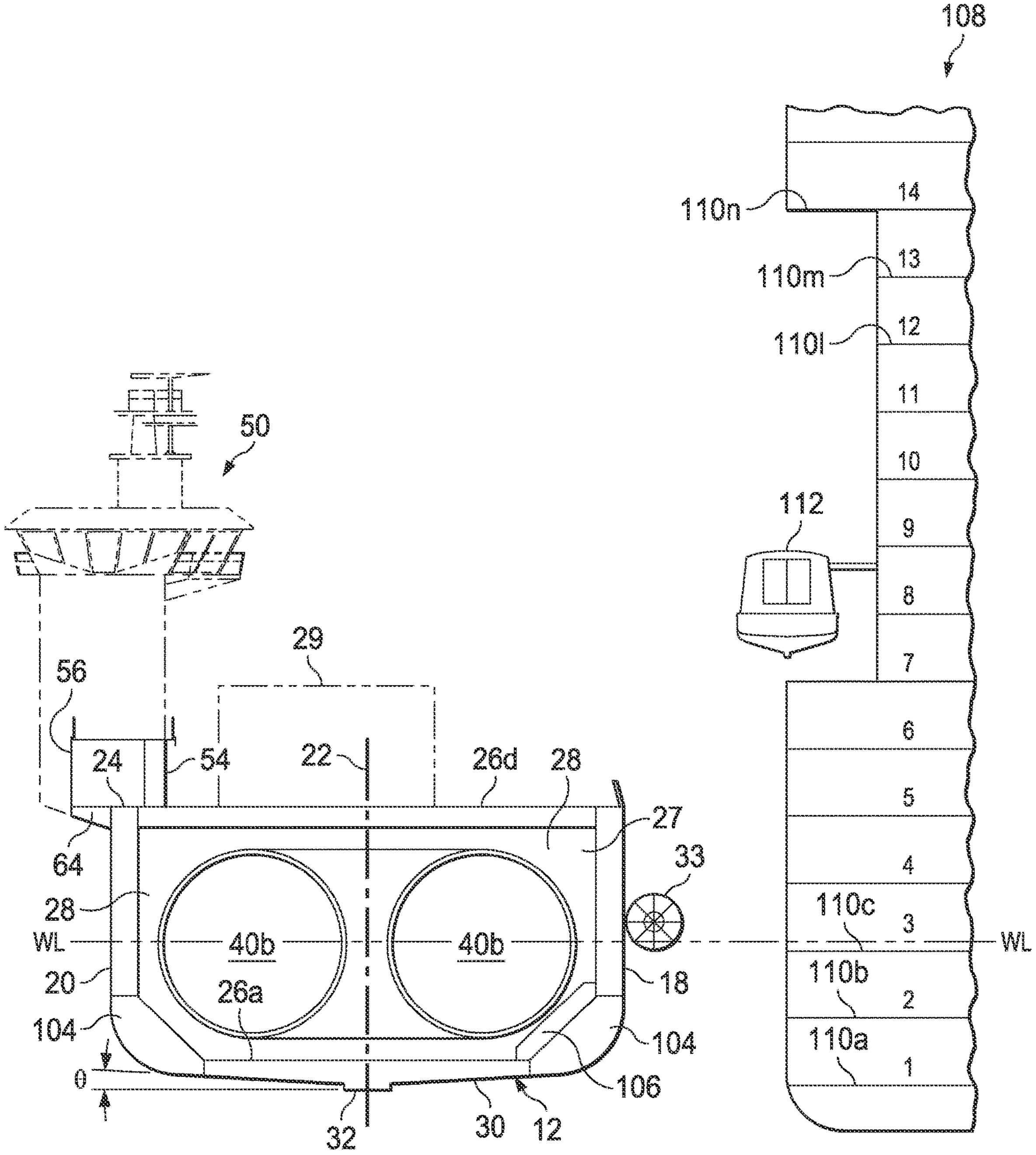
FIG. 9 is a cross-sectional end view of a fuel bunkering vessel taken along line A-A of FIG. 4.

Turning to FIG. 9, a section view of the fuel bunkering vessel 10 taken along section line A-A of FIG. 4 is illustrated. More specifically, a cross section of bunkering marine vessel 10 is illustrated adjacent a cross section of a fuel recipient ship 108, such as a cruise ship. As shown, cruise ship 108 includes decks 110*a*-110*n*, illustrating the relative height above the waterline (WL) of the cruise ship 108 compared to bunkering marine vessel 10 with a fender 33 disposed between fuel bunkering vessel 10 and fuel recipient ship 108. In any event, fuel bunkering vessel 10 is illustrated as having a hull 12 with substantially vertical first and second hull sides 18, 20, respectively, spaced apart from a substantially vertical centerline plane 22, each hull side 18, 20 terminating in an upper side edge 24. The hull 12 includes a plurality of hull decks 26, including the lowest full deck 26*a* of the hull 12, and a main deck, which is the highest full deck 26*d* of the hull 12. The main deck 26*d* extends between the two hull sides 18, 20 to define a hull interior 27 having a volume 28 within the hull 12, the hull interior 27 and volume 28 defined by the main deck 26*d*, the lowermost deck 26*a*, the hull sides 18, 20 and the hull ends 14, 16. A keel 32 extends between the two ends 14, 16 (not shown). The hull 12 may be a single or multiple hull arrangement. In the illustrated embodiments, a double hull arrangement is shown, with an inner hull and an outer hull as is well known in the industry.

In one or more embodiments, the bottom 30 of the hull 12 extending between the two hull sides 18, 20 is substantially flat with little or no deadrise. In some embodiments, the deadrise angle θ amidships is between 0-10 degrees. In some embodiments, the amidships deadrise angle θ is less than 30 degrees. In some embodiments, the deadrise angle θ is less than 20 degrees. In some embodiments, the deadrise angle θ is less than 10 degrees. Thus, haying substantially shapes in some embodiments, the hull ends 14, 16 have substantially the same parabolic shape, rake angle and deadrise angle. In this regard, the deadrise angle at the bow end 14 is substantially the same as the deadrise angle at the stern end 16 of hull 12.

At least one primary or main bunkering fuel storage tank 40 is positioned within hull interior 27 and substantially fills the volume 28 of hull 12. In one or more embodiments, main bunkering fuel storage 40 extends between the first and second sides 18, 20 of the hull 12. In one or more embodiments, main bunkering fuel storage 40 is symmetrically positioned within the hull 12 along the centerline plane 22. In a non-limiting example, in some embodiments, primary or main bunkering fuel storage tanks 40 fill at least 30 percent of the volume 28 of the hull 12, while in other embodiments, primary or main bunkering fuel storage tanks fill 40 at least 30-50 percent of the volume 28 of the hull 12, while in other embodiments, primary or main bunkering fuel storage tanks 40 fill more than 50 percent of the volume 28 of the hull 12.

Multi-deck accommodation structure 50 is positioned adjacent the edge 24 of the second hull side 20 and extending along a portion of the edge 24 so as to be spaced apart from the centerline plane 22. Accommodation structure 50 is generally formed of a first elongated exterior side 54 which faces the first hull side 18 and is generally parallel with but spaced apart from the centerline plane 22; and a second elongated exterior side 56 which is positioned beyond the edge 24 of second hulls side 20. In one or more embodiments, a substantial portion of the accommodation structure 50, and in particular first exterior side 54, is positioned spaced away from the centerline plane 22 and does not cross the centerline plane 22. In one or more embodiments, as illustrated, an accommodation support structure 64 may extend from the hull 12 or main deck **26*d* and support the accommodation structure 50**.

While the bunkering marine vessel 10 includes standard ballast tanks, such as the illustrated water ballast tanks 104, generally symmetrically positioned about the vessel 10 as is well known in the industry, are positioned adjacent the first hull side 18. In the illustrated embodiments, these additional cargo tanks 106 are shown adjacent the first hull side 18 and positioned between the main hunkering fuel storage tanks 40. As with the main bunkering fuel storage tanks 40, these additional cargo tanks 106 used for ballast purposes may extend from the lowest hull deck **26*a* to a height of just below the main deck 26*d***.

Figure 10:
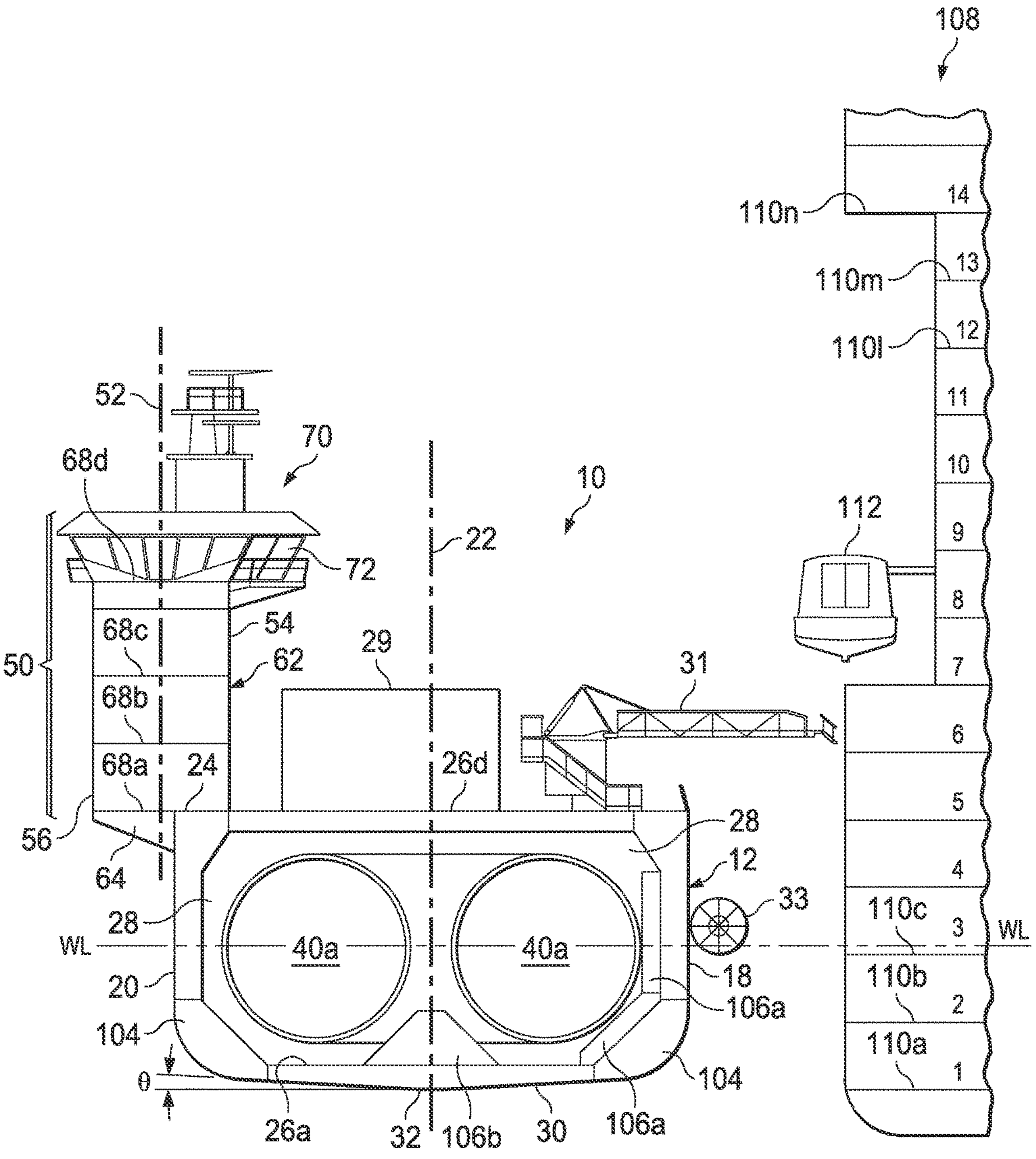
FIG. 10 is a cross-sectional end view of a fuel bunkering vessel taken along line B-B of FIG. 4.

Turning to FIG. 10, a section view of the fuel bunkering vessel 10 taken along section line B-B of FIG. 4 is illustrated. More specifically, a cross section of hunkering marine vessel 10 is taken through accommodation structure 50 to illustrate the spacing of accommodation structure 50 relative to fuel recipient ship 108 when fuel bunkering vessel 10 is alongside fuel recipient ship 108, such as during a bunkering operation. In such an operation, the first side 18 of vessel 10, also referred to as the "bunkering side", is positioned adjacent or closest to ship 108 with fender 33 positioned along water line WL therebetween. A gangway 31 may be pivoted to engage ship 108. In any event, as can be seen, accommodation structure 50 being formed along second side 20 of vessel 10, is spaced apart from ship 108 a distance of approximately the width of upper deck **26*d*. An important feature of fuel bunkering vessel 10 in one or more embodiments is that accommodation structure 50 is offset to one side of fuel bunkering vessel 10 as compared to prior art bunkering ships having accommodation structures centrally located, such as about the centerline plane of a prior art hunkering vessel. By positioning accommodation structure 50 as shown, as fuel bunkering vessel 10 rolls under wave action or current, the likelihood of collision between accommodation structure 50 and ship 108 is minimized, even for multi-story accommodation structures. In this regard, such position allows for accommodation structure 50 to be multi-story and of greater height than prior art, centrally located accommodation structures. Thus, in one or more embodiments, accommodation structure 50 preferably includes at least two decks 68, such as decks 68*a* and 68*b*, with a portion of each deck fully enclosed, and with a bridge deck 68*d* and a bridge 70 mounted on top of the accommodation structure 50. As used herein, a fully enclosed portion of a deck refers to a deck that substantially spans the accommodation structure from side to side and end to end which structure is generally enclosed by one or more exterior walls. As used herein, a bridge refers to a structure mounted on a bridge deck which is enclosed by one or more exterior walls. In one or more embodiments, the lowest deck 68*a* of the accommodation structure 50 may be the same as the main deck 26*d* of hull 12. In some embodiments, main deck 26*d* of hull 12 may extend beyond the second hull side 20 to form the lowest accommodation structure deck 68*a*. In other embodiments, the lowest accommodation structure deck 68 may be raised above or otherwise separate from the main deck 26*d*. In one or more embodiments such as shown in the Figures, the accommodation structure 50 includes at least three full decks 68*a*. 68*b*, 68*c*. In one or more embodiments, a wheelhouse 72 may extend from the bridge 70 out towards the first side 18 of the hull 12. The bridge 70 is the part of the fuel bunkering vessel 10 from which the vessel 10 is commanded for maneuvering and navigation and which gives the bridge team the best view of the surrounding waters as well as a full view of main deck 26*d***.

In any event, multi-deck accommodation structure 50 is generally formed along main axis 52, a substantial portion of the accommodation structure 50 being is spaced apart from the centerline plane 22, positioned adjacent the edge 24 of the second hull side 20 and extending along a portion of the edge 24 of the second hull side 20. Accommodation structure 50 is generally formed of a first elongated exterior side 54 which faces the first hull side 18 and is generally parallel with but spaced apart from the centerline plane 22; a second elongated exterior side 56 which is positioned beyond the edge 24 of second hulls side 20 which together form an enclosure 62 having an enclosed volume.

FIG. 10 also illustrates the cargo tanks 106 as they may be positioned within hull 12 of vessel 10. In the illustrated embodiment, a cargo tank **106*b* is show positioned on deck 26*a* along centerline plane 22 below each bunkering fuel storage tank 40. In addition, cargo tank 106*a* is asymmetrically positioned within hull 12 relative to centerline plane 22. Specifically, fuel cargo tank(s) 106*a* is positioned within hull 12 so as to be between centerline plane 22 and first hull side 18. so that the weight of fuel within fuel cargo tank(s) 106*a* can be utilized to counter the weight of accommodation structure 50 positioned along second hull side 20. In one or more embodiments, fuel cargo tank(s) 106*a* may extend along the length of first hull side 18, while in other embodiments, fuel cargo tank(s) 106*a* may one or more discreet cargo tanks positioned adjacent first hull side 18. Such fuel cargo tank(s) 106*a* may or may not be symmetrically positioned about amidships plane 66. In some embodiments, cargo tank 106*a* may extend through two or more decks. It will be appreciated that the total number of cargo tanks 106** described herein has a total cargo tank volume, and the positioning as of the cargo tanks 106 as described herein is to ensure that a greater amount of the total volume of the cargo tanks 106 is distributed asymmetrically about the centerline plane 22 so as to be closer to the first hull side 18. In one or more embodiments, this may be accomplished with a single cargo tank 106 positioned between the centerline plane 22 and the first hull side 18, or a plurality of carto tanks 106, with a greater number of the plurality of cargo tanks 106 positioned asymmetrically about centerline plane 22 so as to be closer to first hull side 18.

Also shown in FIG. 10 is the reliquification equipment 29 positioned on main deck 26*d*.

Figure 11A:
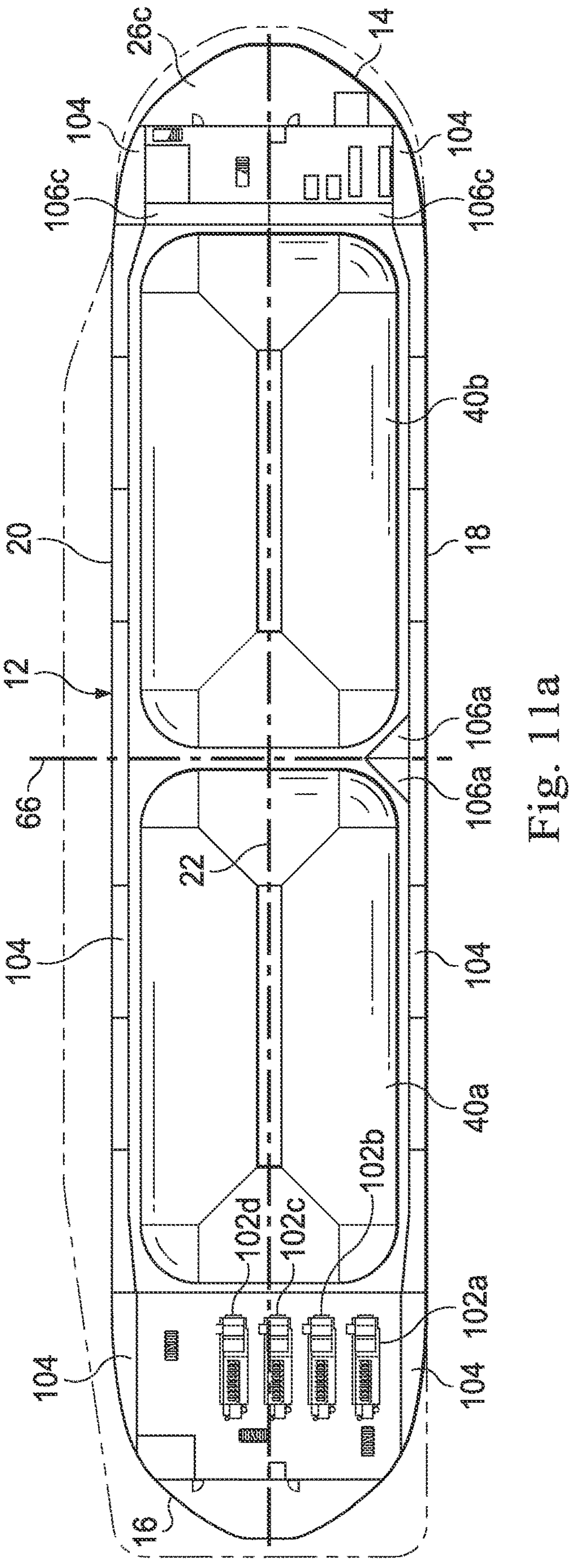
FIG. 11*a* is a plan view of an upper mid-deck of ˉthe hull of a fuel bunkering vessel.
Figure 11B:
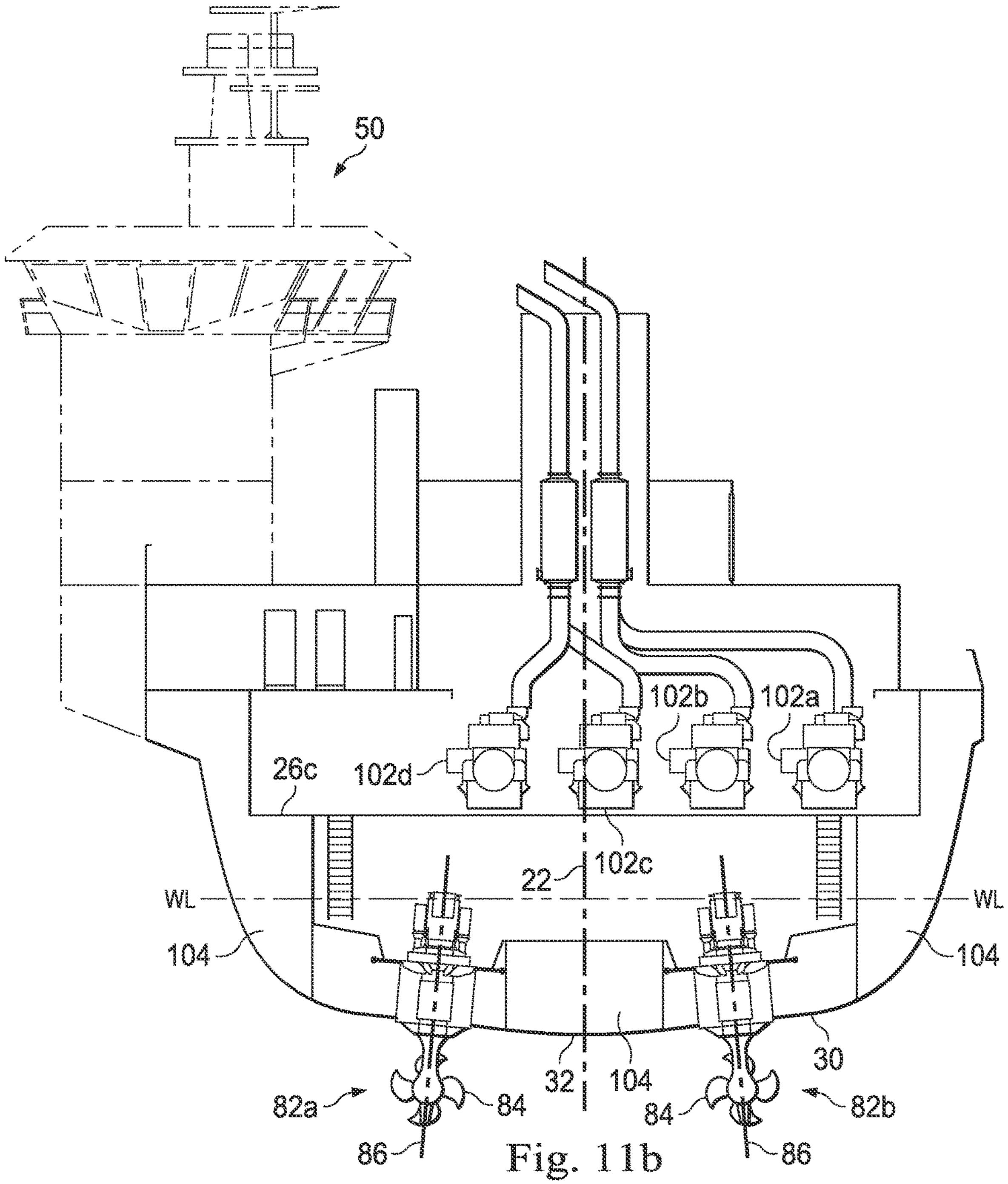
FIG. 11*b* is a cross-sectional end view of a fuel bunkering vessel taken along line C-C of FIG. 4.

Turning to FIG. 11*a*, a plan view of mid-deck 26*c* of hull 12 is illustrated, while in FIG. 11*b* a section view of the fuel bunkering vessel of FIG. 4 taken along section line C-C is shown. Although the individual interior decks 26*a*-26*c* are not limited to a particular purpose, in the illustrated embodiment, engines 102*a*, 102*b*, 102*c* and 102*d* are deployed on deck 26*c*. In one or more embodiments, to compensate for the weight of the accommodation structure 50 being positioned along the second hull side 20 of the vessel 10, the engines 102 may be positioned asymmetrically about the centerline plane 22 so as to be closer to the first hull side 18 of the vessel 10. Thus, in embodiments with only one engine 102, the engine 102 would be positioned on a deck between the centerline plane 22 and the first hull side 18. In the illustrated embodiment with four engines, first and second engines 102*a*, 102*b* are positioned between the centerline plane 22 and the first hull side 18 with a third engine 102*c* positioned on the centerline plane 22. In the embodiment, the third engine 102*c* is asymmetrically divided by the centerline plane 22 so as to be nearer the first hull side 18 than the second hull side 20. Only the fourth engine 102*d* is positioned between the centerline plane 22 and the second hull side 20.

In addition, as described above, at least one primary or main bunkering fuel storage tank 40 extends between the first and second sides 18, 20 of the hull 12 and is symmetrically positioned within the hull 12 along the centerline plane 22 and between the two bull ends 14, 16. In some embodiments, two or more primary or main bunkering fuel storage tanks 40*a*, 40*b* are symmetrically positioned within the hull 12 along the centerline plane 22 and between the two hull ends 14, 16, while in other embodiments, three or more primary or main bunkering fuel storage tanks 40*a*, 40*b*, 40*c* are symmetrically positioned within the hull 12 along the centerline plane 22 and between the two hull ends 14, 16. In still vet other embodiments, four or more primary or main hunkering fuel storage tanks are symmetrically positioned within the hull 12 along the centerline plane 22 and between the two hull ends 14, 16.

Likewise, in one or more embodiments, the main fuel bunkering cargo tank(s) 40 is substantially balanced about an amidships plane 66 equidistance between the two hull ends 14, 16. In other words, the hunkering cargo tank(s) 40 is substantially symmetrical about the amidships plane 66, straddling the plane 66 so as to be equidistance between the two hull ends 14, 16.

In the illustrated embodiment, it will be appreciated that since fuel cargo tanks 40*a*, 40*b* are illustrated with respect to mid-deck 26*c*, the fuel cargo tanks 40*a*, 40*b* are of a height rising from a lower deck, such as 26*a* or 26*b* (see FIG. 4), to extend up through at least mid-deck 26*c*. Thus, it will be appreciated that fuel cargo tanks 40*a*, 40*b*, fill a significant portion of the volume of hull 12.

As described above, in one or more embodiments, fuel bunkering vessel 10 also may include additional cargo tanks 106*a* selected and positioned adjacent the first hull side 18 to counter the weight of the accommodation structure 50 (see FIG. 4) positioned along the second hull side 20, (much like the engine placement was selected to counter the weight of the accommodation structure 50). In the illustrated embodiment of FIG. 11, additional cargo tanks 106*a* are shown positioned adjacent the first hull side 18 and between the main bunkering fuel storage tanks 40*a* and 40*b* generally about plane 66. Alternatively, additional fuel bunkering cargo tanks 106*a* may be fuel tanks for engines 102, which fuel tanks may be utilized to counter the weight of the accommodation structure 50. Alternatively, additional fuel bunkering cargo tanks 106*a* may be water ballast tanks that may be utilized to counter the weight of the accommodation structure 50. Likewise, it will be appreciated that in addition to cargo tanks 106*a* or in the alternative, water ballast tanks along first side 18 of hull 12 may be utilized to counter the weight of accommodation structure 50 along the second side 20 of hull 12. In any event, such fuel cargo tank(s) 106*a* may or may not be symmetrically positioned about amidships plane 66. In some embodiments, cargo tank 106*a* may extend through two or more decks, such as the illustrated embodiment where cargo tanks 106*a* are shown extending at least through mid-deck 26*c*. In one or more embodiments, cargo tanks 106*a* may be shaped and sized to be positioned within a spaced formed between adjacent bunkering fuel storage tanks 40*a*, 40*b*. It will be appreciated that because of the curved nature of certain bunkering fuel storage tanks 40, an open space may be formed between adjacent bunkering fuel storage tanks 40.

Further, FIG. 11*a* illustrates cargo tanks 106*c* positioned forward of bunkering fuel storage tank 40*b* at the bow end 14 of vessel 10. Although not limited to a particular volume, for purposes of the illustrating the difference in volume between cargo tanks 106 and bunkering fuel storage tanks 40, each of the two illustrated discreet cargo tanks 106*a* may have a volume of approximately 45 $m^3$. In other embodiments, each discreet cargo tank 106*a* may have a volume of between 30 and 100 $m^3$.

Figure 12:
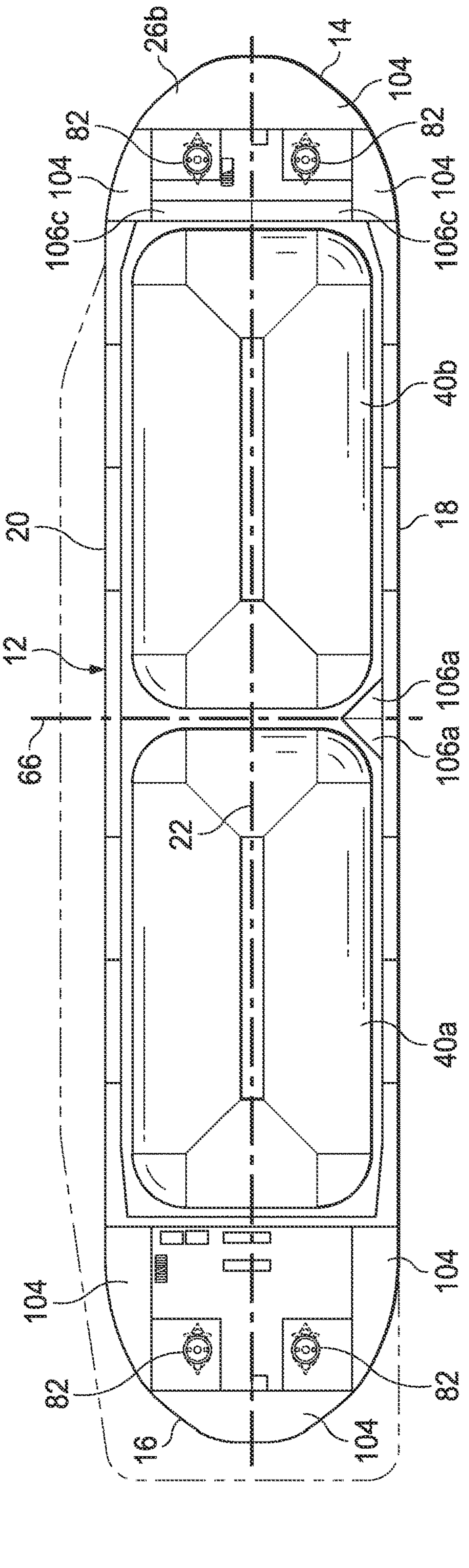
FIG. 12 is a plan view of a lower mid-deck of the hull of a fuel bunkering vessel.

Turning to FIG. 12, mid-deck 26*b* of hull 12 is illustrated. Although the individual interior decks 26*a*-26*c* are not limited to a particular purpose, in the illustrated embodiment, internal components of marine propulsion system 82 are mounted on deck 26*b*. Deck 26*b* may also include auxiliary equipment and/or additional stores.

In addition, as described above, at least one primary or main bunkering fuel storage tank 40 extends between the first and second sides 18, 20 of the hull 12 and may be symmetrically positioned within the hull 12 along the centerline plane 22 and between the two hull ends 14, 16. In some embodiments, two or more primary or main bunkering fuel storage tanks 40*a*, 40*b* may be symmetrically positioned within the hull 12 along the centerline plane 22 and between the two hull ends 14, 16, while in other embodiments, three or more primary or main bunkering fuel storage tanks 40*a*, 40*b*, 40*c* may be symmetrically positioned within the hull 12 along the centerline plane 22 and between the two hull ends 14, 16, In still yet other embodiments, four or more primary or main bunkering fuel storage tanks may be symmetrically positioned within the hull 12 along the centerline plane 22 and between the two hull ends 14, 16.

Likewise, in one or more embodiments, the main fuel bunkering cargo tank(s) 40 is substantially balanced about an amidships plane 66 equidistance between the two hull ends 14, 16. In other words, the bunkering cargo tank(s) 40 is substantially symmetrical about the amidships plane 66, straddling the plane 66 so as to be equidistance between the two hull ends 14, 16.

In FIG. 12, it will be appreciated that since fuel cargo tanks 40*a*, 40*b* are illustrated with respect to mid-deck 26*b*, the fuel cargo tanks 40*a*, 40*b* may be mounted on deck 26*b* or are of a height rising from a lower deck, such as 26*a* (see FIG. 4), to extend up through at least mid-deck 26*b*. Thus, it will be appreciated that fuel cargo tanks 40*a*, 40*b*, fill a significant portion of the volume of hull 12.

As described above, in one or more embodiments, fuel bunkering vessel 10 also may include additional cargo tanks 106*a* selected and positioned adjacent the first hull side 18 to counter the weight of the accommodation structure 50 (see FIG. 4) along the second hull side 20, much like the engine placement was selected to counter the weight of the accommodation structure 50. In the illustrated embodiment of FIG. 12, additional cargo tanks 106*a* are shown adjacent the first hull side 18 and positioned between the main bunkering fuel storage tanks 40*a* and 40*b* generally about plane 66. Alternatively, additional fuel bunkering cargo tanks 106*a* may be fuel tanks for engines 102, which fuel tanks may be utilized to counter the weight of the accommodation structure 50. Alternatively, additional fuel bunkering cargo tanks 106*a* may be water ballast tanks that may be utilized to counter the weight of the accommodation structure 50. Likewise, it will be appreciated that in addition to additional fuel bunkering cargo tanks 106*a* or in the alternative, water ballast tanks along first side 18 of hull 12 may be utilized to counter the weight of accommodation structure 50 along the second side 20 of hull 12. in any event, such fuel cargo tank(s) 106*a* may or may not be symmetrically positioned about amidships plane 66, In some embodiments, cargo tank 106*a* may extend through two or more decks, such as the illustrated embodiment where cargo tanks 106*a* are shown extending at least through mid-deck 26*b*.

Figure 13:
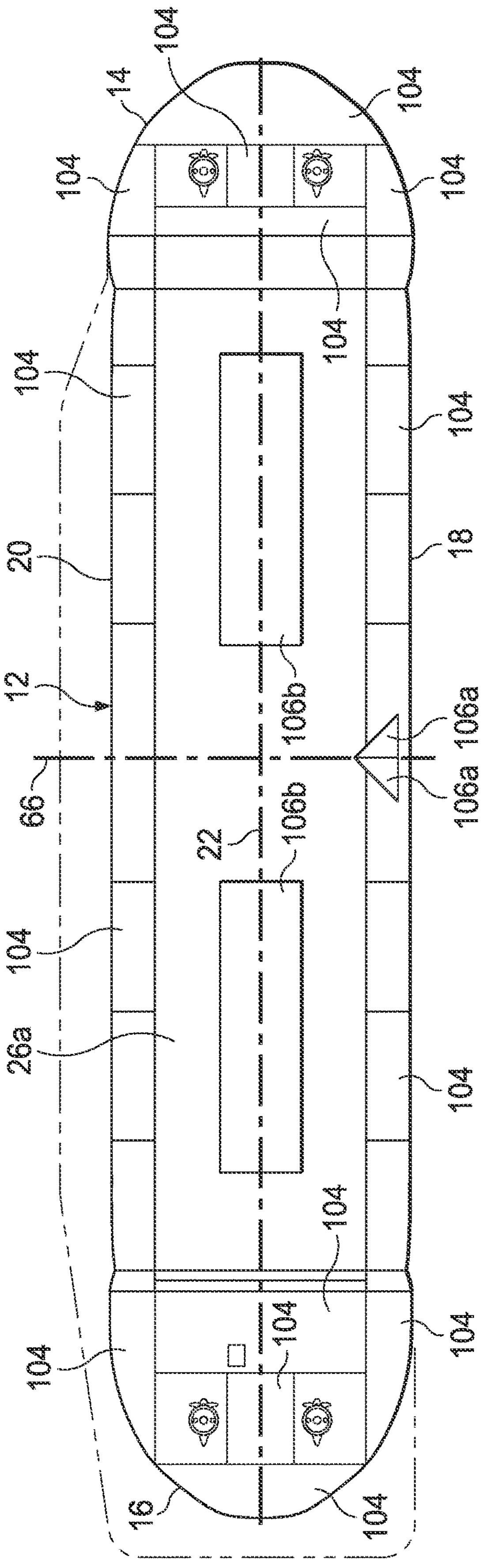
FIG. 13 is a plan view of the lowest deck of the hull of a fuel bunkering vessel.

Turning to FIG. 13, the orlop deck 26*a*, which is the lowermost or lowest full deck of the hull 12, is illustrated. Deck 26*a* is shown as having standard ballast tanks, such as the illustrated water ballast tanks 104, generally symmetrically positioned about the vessel 10, as is well known in the industry, about centerline plane 22 as well as amidships plane 66. Vessel 10 also may include additional cargo tanks 106 positioned adjacent first hull side 18 and spaced apart from second hull side 20 to counter the weight of the accommodation structure 50 (see FIG. 3) positioned along the second hull side 20. In the illustrated embodiments, additional cargo tanks 106*a* are shown adjacent the first hull side 18 and positioned between the main bunkering fuel storage tanks 40. As with the main bunkering fuel storage tanks 40, these additional cargo tanks 106*a* used for ballast purposes may extend from the lowest hull deck 26*a* to a. height of just below the main deck 26*d*. Further, additional cargo tanks 106*b* are shown positioned along centerline plane 22. These additional cargo tanks 106*b* may be symmetrical about centerline plane 22 or positioned so as to be asymmetrical about centerline plane 22, spaced closer to first hull side 18 and spaced farther from second hull side 20. As stated above, such fuel cargo tank(s) 106*a* may or may not be symmetrically positioned about amidships plane 66. In some embodiments, cargo tank 106*a* may extend through two or more decks, such as the illustrated embodiment where cargo tanks 106*a* are shown extending at least through mid-deck 26*b*.

In some embodiments, the primary or main bunkering fuel storage tank(s) 40 described above may be mounted on deck 26*a* and extend up through one or more mid-decks 26*b-c*, while in other embodiments, the primary or main bunkering fuel storage tank(s) 40 described above may be mounted on deck 26*b* and extend up through one or more mid-decks 26*c*. In some embodiments, main bunkering fuel storage tank(s) 40 may extend through main deck 26*d* and above the surface of main deck 26*d*.

Figure 14:
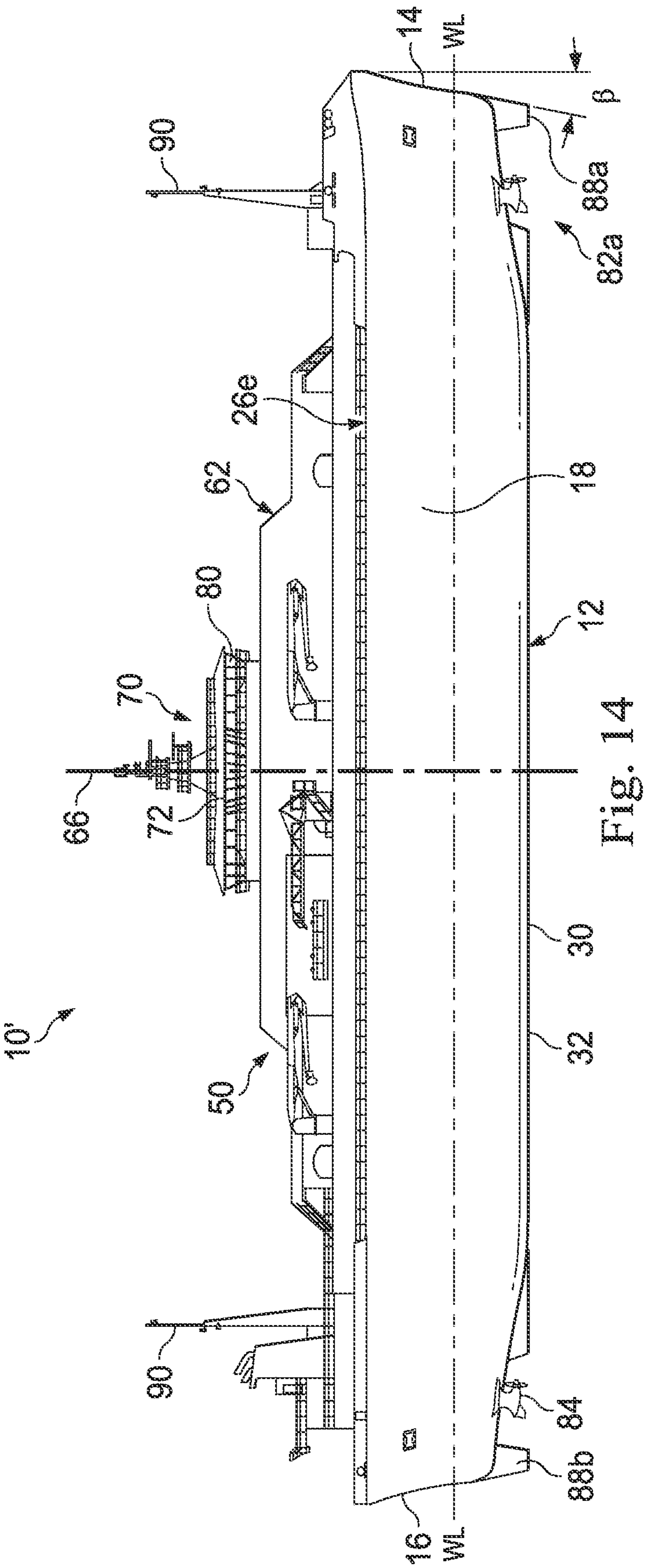
FIG. 14 is an elevation view of another embodiment of the bunkering side of a fuel bunkering vessel with an accommodation structure extending along an opposite side of the fuel bunkering vessel.

FIGS. 14-25 show another embodiment of a bunkering marine vessel, identified as bunkering marine vessel 10'. In FIG. 14, bunkering marine vessel 10' includes an elongated hull 12 having a first or bow end 14 and a second or stern end 16. Hull 12 is formed of a substantially vertical first hull side 18. In FIG. 14, first hull side 18 is the starboard side of bunkering marine vessel 10. The bottom 30 of hull 12 extending between the first end 14 and the second end 16 is shown as having a keel 32. The hull 12 includes a plurality of hull decks 26, including main deck, which is the highest full deck of the hull 12. In the illustrated embodiment of FIG. 14, the highest full deck is shown as deck 26*e*. An elongated, multi-deck accommodation structure 50 is generally formed adjacent main deck 26*e* and extends lengthwise adjacent main deck 26*e*. More specifically, the accommodation structure 50 is positioned adjacent main deck 26*d* to be substantially equidistance from each of the two hull ends 14, 16 so that the weight of the accommodation structure 50 is substantially balanced about an amidships plane 66 equidistance between the two hull ends 14, 16, and perpendicular to the hull side 18. In other words, the accommodation structure 50 is substantially symmetrical about the amidships plane 66, straddling the plane 66 so as to be equidistance between the two hull ends 14, 16.

The accommodation structure 50 preferably includes at least two full decks 68 (see FIG. 16), enclosed by an enclosure 62, with a bridge 70 at the top of the accommodation structure 50, As will be appreciated, each deck 68 typically includes one or more portholes 69 along each deck 68 and thus the illustration, having at least three levels of portholes 69, may be interpreted to include at least three decks 68 enclosed by enclosure 62, in addition to the bridge 70. In one or more embodiments, a wheelhouse 72 may extend from the bridge 70 with windows 80 wrapping around at least a portion of bridge 70. In one or more embodiments, a masthead 90 may be positioned near one or both ends 14, 16 of hull 12, where each masthead 90 is spaced apart from the accommodation structure 50.

A first marine propulsion system 82*a* is positioned adjacent the keel 32 at the first end 14 of the hull 12 and a second marine propulsion system 82*b* is positioned adjacent the keel 32 at the second end 16 of the hull 12. The marine propulsion system 82 may include a propeller, water jet or other thruster 84. In one or more embodiments, each marine propulsion system 82 may be disposed to swivel about a thruster axis. In one or more embodiments, each marine propulsion system 82 may be disposed to swivel at least 90 degrees on a thruster axis 86, while in one or more other embodiments, each marine propulsion system 82 may be disposed to swivel at least 180 degrees on a thruster axis 86, while in one or more embodiments, each marine propulsion system 82 may be disposed to swivel at least 270 degrees on a thruster axis 86, while in other embodiments, each first marine propulsion system 82 may swivel 360 degrees on the thruster axis 86. In one or more embodiments, two marine propulsion systems 82 are provided at each end 14, 16 of the hull 12, spaced apart from one another on either side of the keel 32. In one or more embodiments, a seakeeping hull appendage 88 may be positioned adjacent each marine propulsion system. In the illustrated embodiment, at least one seakeeping hull appendage 88 is positioned adjacent each end 14, 16 of the hull 12, spaced outwardly from the marine propulsion system 82 on that end. It will be appreciated that having a thruster 84 positioned adjacent each end 14, 16 of hull 12 and each capable of swiveling at least 270 degrees can function as a dynamic position system, allowing bunkering marine vessel 10 to perform bunkering operations without the use of fenders and ropes.

In one or more embodiments, the outer hull ends 14, 16 of vessel 10', and in particular, the outer shape of the first hull end or bow 14 and the outer shape of the second hull end or stern 16, is substantially the same at least at or below the waterline (WL), regardless of the outer shape selected for the two hull ends 14, 16. Thus, the outer hull shape at the first and second hull ends 14, 16 adjacent at least the first and second hull decks 26*a*, 26*b* is the same shape (see FIGS. 25 and 26). In some embodiments, the first and second hull ends 14. 16 adjacent at least the first, second and third hull decks 26*a*, 26*b*, 26*c* is the same shape (see FIGS. 24, 25 and 26). In this regard, the first and second hull ends 14, 16 may have any shape, including without limitation, a bulbous bow, a plumb bow, a curved bow, and inverted bow, a raked bow or a strait bow, among others, such that the lower portion of hull 12 is substantially symmetrical about amidships plane 66. Thus, in some embodiments, the hull ends 14, 16 have substantially the same deadrise angle. Likewise, in some embodiments, the first and second ends 14, 16 may have a similar rake angle β and a similar parabolic. In some embodiments, the rake angle β is between 0-15 degrees. In some embodiments, the rake angle β is approximately 12 degrees. In some embodiments, the rake angle β is less than 30 degrees. In some embodiments, the rake angle β is less than 20 degrees. In some embodiments, the rake angle β is less than 10 degrees.

Figure 15:
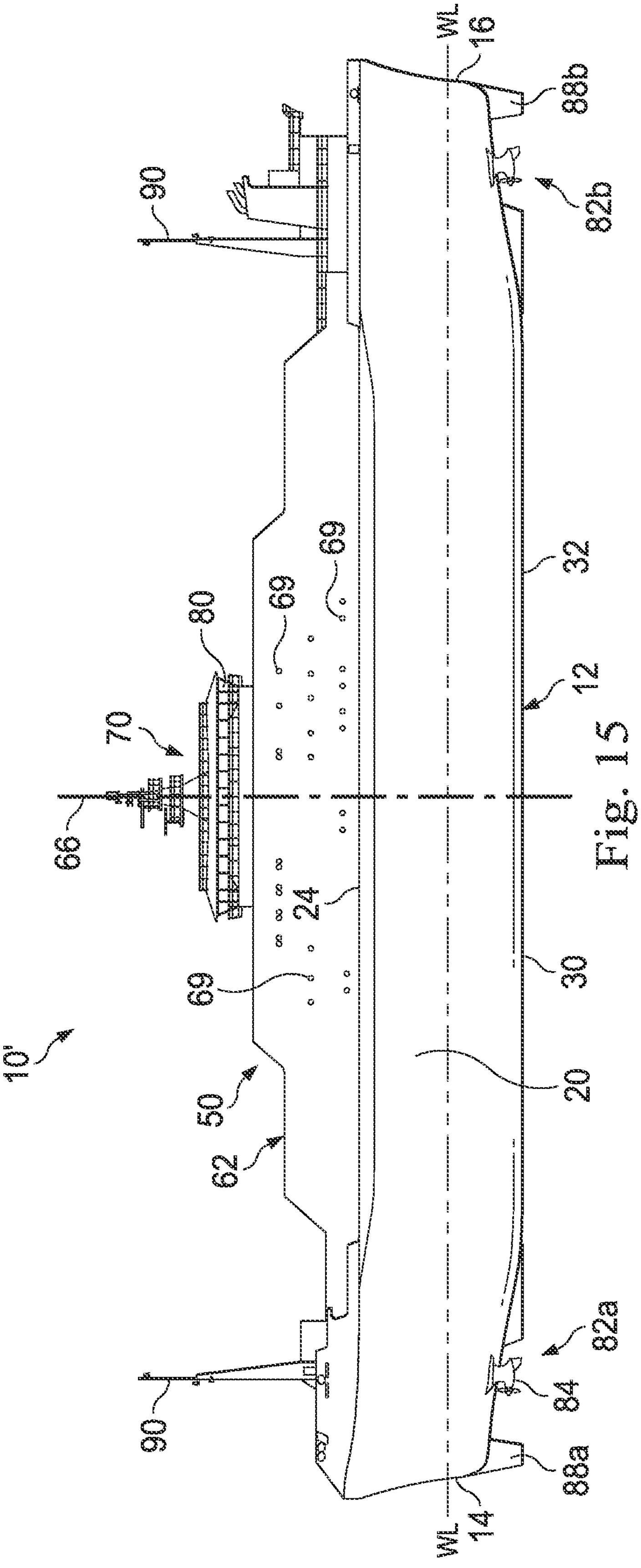
FIG. 15 is an elevation view of the accommodation structure side of the fuel bunkering vessel of FIG. 14.

Turning to FIG. 15, a side elevation view of a bunkering marine vessel 10' illustrates accommodation structure 50 extending along substantially vertical second side 20 of hull 12. In particular, second hull side 20 terminates in an upper side edge 24 and accommodation structure 50 extends along the length of at least a portion of side edge 24. In one or more embodiments, accommodation structure 50 extends for at least 15% of the length of second hull side 20 between the two hull ends 14, 16. In one or more embodiments, accommodation structure 50 extends for at least 25% of the length of second hull side 20 between the two hull ends 14, 16. In one or more embodiments, accommodation structure 50 extends for at least 50% of the length of second hull side 20 between the two hull ends 14, 16.

FIG. 15 also illustrates windows 80 extend substantially around the full perimeter of the bridge 70 in some embodiments.

Figure 16:
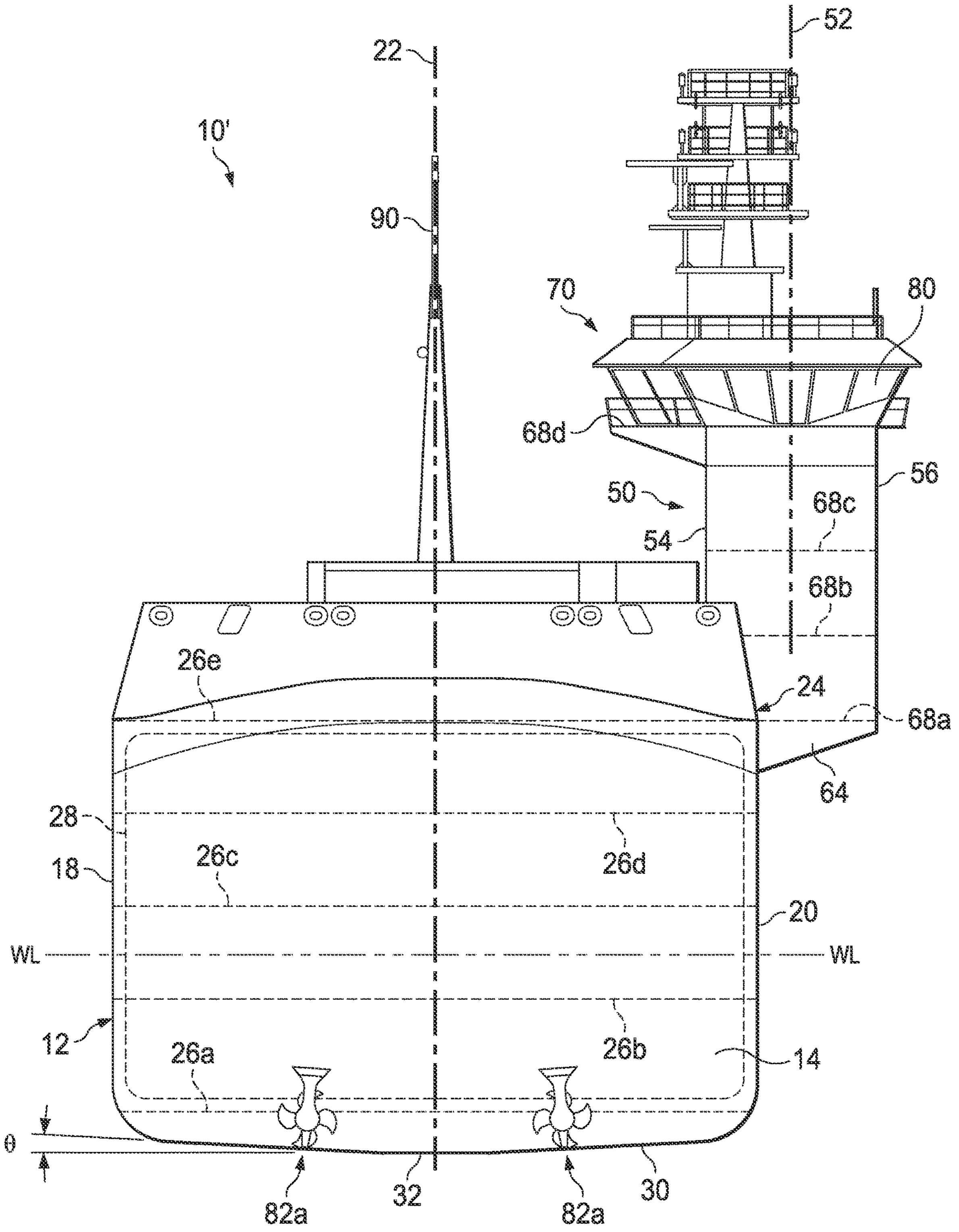
FIG. 16 is an elevation end view of the bow of the fuel bunkering vessel of FIG. 14.

Turning to FIG. 16, an elevation view of the bow end 14 of the fuel bunkering vessel 10' better illustrates the positioning of accommodation structure 50 along the second side 20 of hull 12. As shown, substantially vertical first and second hull sides 18, 20, respectively, are spaced apart from a substantially vertical centerline plane 22 extending between the first and second hull ends 14, 16. Accommodation structure is 50 is generally formed about a main axis 52, a substantial portion of the accommodation structure 50 being is spaced apart from the centerline plane 22, positioned adjacent the edge 24 of the second hull side 20 and extending along a portion of the edge 24 of the second hull side 20 between the two hull ends 14, 16 (see FIG. 15). Accommodation structure 50 has a first elongated exterior side 54 which faces the first hull side 18 and is generally parallel with but spaced apart from the centerline plane 22. Accommodation structure 50 further has a second elongated exterior side 56 which is positioned beyond the edge 24 of second hulls side 20, In one or more embodiments, the accommodation structure 50 is positioned on the main deck 26*e* adjacent the intersection of the main deck 26*e* and the second hull side 20, while in other embodiments, the accommodation structure 50 is positioned above the main deck 26*e*, In one or more embodiments, a substantial portion of the accommodation structure 50, and in particular first exterior side 54, is positioned spaced away from the centerline plane 22 and does not cross the centerline plane 22. In one or more embodiments, a substantial portion of the length of the accommodation structure 50 extends beyond main deck 26*e*, past edge 24 of second hull side 20 and out over the second side 20 of the hull 12 so as to be cantilevered with respect to the second side 20 of the hull 12. In one or more embodiments, at least twenty five percent (25%) of the enclosed volume of the accommodation structure 50 extends beyond main deck 26*e*, past edge 24 of second hull side 20 and out over the second side 20 of the hull 12 so as to be cantilevered with respect to the second side 20 of the hull 12. In one or more embodiments, at least fifty percent (50%) or more of the enclosed volume of the accommodation structure 50 extends beyond main deck 26*e*, past edge 24 of second hull side 20 and out over the second side 20 of the hull 12 so as to be cantilevered with respect to the second side 20 of the hull 12. Of course, persons of skill in the art will appreciate that the percent volume (if any) of accommodation structure 50 that extends beyond main deck 26*e*, past edge 24 of second hull side 20 and out over the second side 20 of the hull 12 depends in part on the width of the main deck 26*e* and the width of accommodation structure 50 between the first and second exterior sides 54, 56. In some embodiments, the width of main deck 26*e* may be sufficiently wide that accommodation structure 50 may extend along second hull side 20 without overhanging second hull side 20, although in all cases, accommodation structure 50 generally, and first exterior side 54 specifically, are spaced apart from centerline plane 22 as described herein. Thus, in one or more embodiments, accommodation structure 50 generally, and first exterior side 54 specifically, are spaced apart from centerline plane 22 as described herein with the second exterior side 56 of accommodation structure 50 being positioned between the first exterior side 54 and the edge 24 of second hull side 20 as opposed to extending above edge 24 or otherwise overlying edge 24. In any event, an accommodation support structure 64 may extend from the hull 12 or main deck 26*e* and support the accommodation structure 50.

As shown, masthead(s) 90 is shown to be positioned along centerline plane 22 and as such, is spaced apart from accommodation structure 50.

In one or more embodiments, the bottom 30 of the hull 12 extending between the two hull sides 18, 20 is substantially flat with little or no deadrise. In some embodiments, the deadrise angle θ is between 0-10 degrees. In some embodiments, the deadrise angle θ is less than 30 degrees. In some embodiments, the deadrise angle θ is less than 20 degrees. In some embodiments, the deadrise angle θ is less than 10 degrees. Thus, being substantially the same in shape, in some embodiments, the hull ends 14, 16 have substantially the same parabolic shape, rake angle and deadrise angle. In one or more embodiments, the maximum draft is approximately 8.00 m, while in other embodiments, the maximum draft is no more than approximately 12.00 m.

As stated above, hull 12 includes a plurality of hull decks 26 (shown in dashed), including an orlop deck, which is the lowermost or lowest full deck of the hull 12, and a main deck, which is the highest full deck of the hull 12. Although the disclosure is not limited to the number of full hull decks, in the illustrated embodiment, hull 12 has 5 full hull decks 26*a*-26*e* numbered decks 1-5 with deck 1 being the orlop deck 26*a* and deck 5 being the main deck 26*e*. The main deck 26*e* extends between the two hull sides 18, 20 to define a hull interior 27 having a volume 28 within the hull 12, the hull interior 27 and volume 28 defined by the main deck 26*e*, the lowermost deck 26*a*, the hull sides 18, 20 and the hull ends 14, 16.

Likewise, as stated above, the accommodation structure 50 preferably includes at least two full, enclosed decks 68, with a bridge deck 68*d* and a bridge 70 mounted on top of the accommodation structure 50. In one or more embodiments, the lowest deck 68*a* of the accommodation structure 50 may be the same as the main deck 26*e* of hull 12. In some embodiments, main deck 26*e* of hull 12 may extend beyond the second hull side 20 to form the lowest accommodation structure deck 68*a*. In other embodiments, the lowest accommodation structure deck 68 may be raised above or otherwise separate from the main deck 26*e*. In one or more embodiments such as shown in the Figures, the accommodation structure 50 includes at least three decks 68*a*, 68*b*, 68*c*. The accommodation structure decks 68 are not limited to a particular purpose and may include without limitation, among other things, command and control, communications, radar, crew cabins, HVAC equipment, galley, mess, storage, machinery and water purification.

Figure 17:
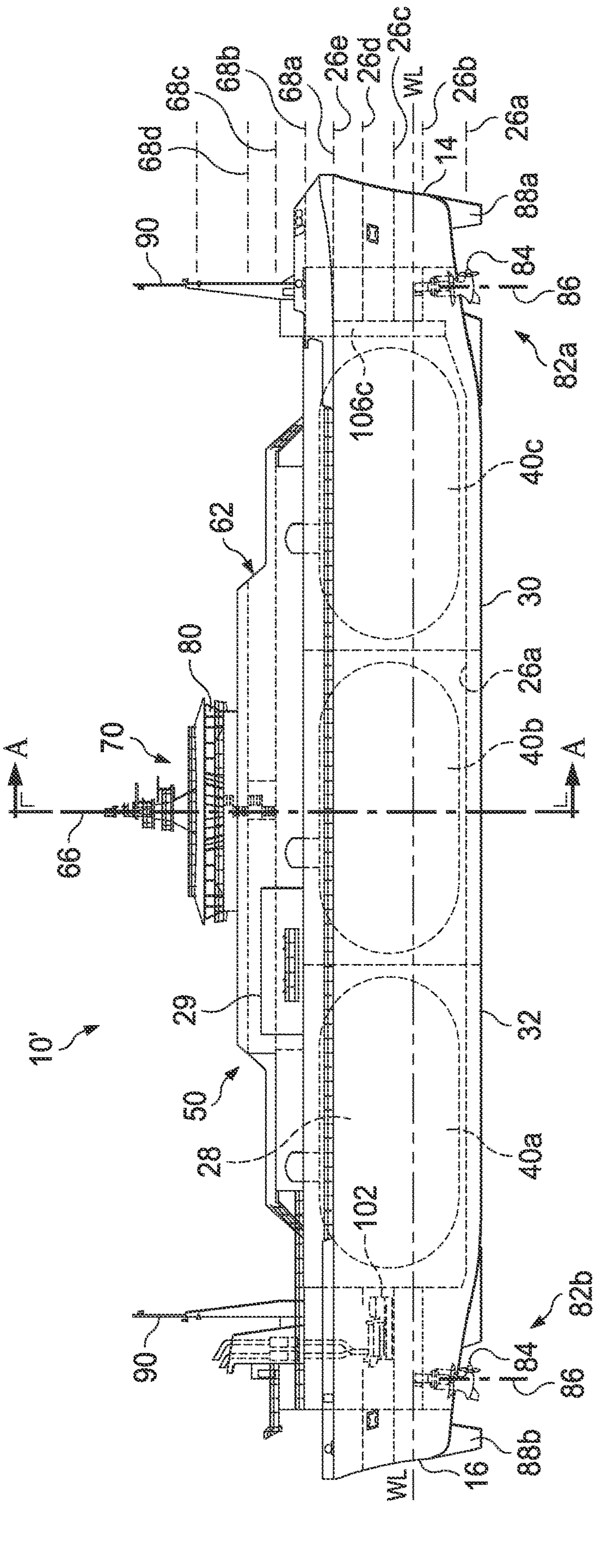
FIG. 17 is a side view of the bunkering side of the fuel bunkering vessel of FIG. 14 illustrating deck and bunkering fuel storage tank positioning within the hull of the fuel bunkering vessel.

With reference to FIG. 17, hull interior 27 is illustrated more specifically with reference to hull decks 26*a*-26*e*. At least one primary or main hunkering fuel storage tank 40 extends between the first and second sides 18, 20 of the hull 12 and may be symmetrically positioned within the hull 12 along the centerline plane 22 (see FIG. 16) and between the two hull ends 14, 16. In the illustrated embodiment, three primary or main bunkering fuel storage tanks 40*a*, 40*b*, 40*c* may be symmetrically positioned within the hull 12 along the centerline plane 22 and between the two hull ends 14, 16, in one or more embodiments, the bunkering fuel storage tank(s) 40 are positioned on the lowest deck 26*a* and extend upwards at least two decks above the lowest deck 26*a* towards the main deck 26*e*. In some embodiments, the primary or main bunkering fuel storage tanks 40 extend from the lowest deck 26*a* to a height just below the main deck 26*e*. In some embodiments, such as is illustrated, main bunkering fuel storage tank(s) 40 extend from a lower deck 26*a* through main deck 26*e* and above the surface of main deck 26*e*.

It will be appreciated that the primary or main bunkering fuel storage tanks 40*a*, 40*b*, 40*c*, fill a substantial amount of the volume 28 of the hull 12 below the main or upper deck 26*e*. In one or more embodiments, bunkering fuel storage tanks 40*a*, 40*b*, 40*c* fill up a significant portion of the volume 28 of the hull 12 between the lowest deck 26*a* and the main deck 26*e*. Thus, it will be appreciated that bunkering fuel storage tank 40 have a significant volume as compared to fuel storage tanks for fueling vessel 10. In the illustrated embodiment, each of bunkering fuel storage tanks 40*a*, 40*c* have a volume of approximately 5900 $m^3$ while hunkering fuel storage tank 40*b* has a volume of approximately 6350 $m^3$ while for an overall total volume of approximately 18000 $m^3$ for bunkering fuel volume. However, the foregoing capacities are for illustrative purposes only. Thus, the capacities could all be the same. It will be appreciated, however, that in one or more embodiments, it is preferable that the capacities of bunkering fuel storage tanks 40*a*, 40*c* are substantially the same to ensure an even weight distribution about amidships plane 66. In any event, in one or more embodiments, the overall total bunkering fuel volume of bunkering fuel storage tanks 40 is at least 10000 $m^{3,}$ while in other embodiments, the overall total bunkering fuel volume is at least 15000 $m^3$.

In addition to bunkering fuel storage tanks 40, vessel 10 also may include additional cargo tanks 106. Cargo tanks 106 may be utilized to provide fuel for vessel 10. In some embodiments, cargo tanks 106 are marine gasoil (MGO) tanks. In the illustrated embodiment, fuel cargo tank(s) 106*c* is shown forward of bunkering fuel storage tanks 40*c* at the bow end 14 of vessel 10'. In some embodiments, fuel cargo tank(s) 106*c* may extend through two or more decks. In the illustrated embodiment, fuel cargo tanks) 106*c* extends through mid-decks 26*c* and 26*d* to just below main deck 26*e*. In non-limiting examples, primarily as a point of comparison to the volume of the bunkering fuel storage tanks 40, each cargo tank 106*c* may have a volume of approximately 155 $m^3$.

For embodiments where bunkering marine vessel 10' is disposed for carrying LNG as the bunkering fuel, bunkering marine vessel 10' may include a reliquification equipment 29, such as is illustrated on shown on deck 5 or main deck 26*e* in the Figures.

The bunkering marine vessel 10' includes at least one engine 102 for driving a propulsion system 82. Without limiting the foregoing, the engines 102 may be marine diesel engines as are well known in the industry, while in other embodiments, the engines may be other types of engines.

Figure 18:
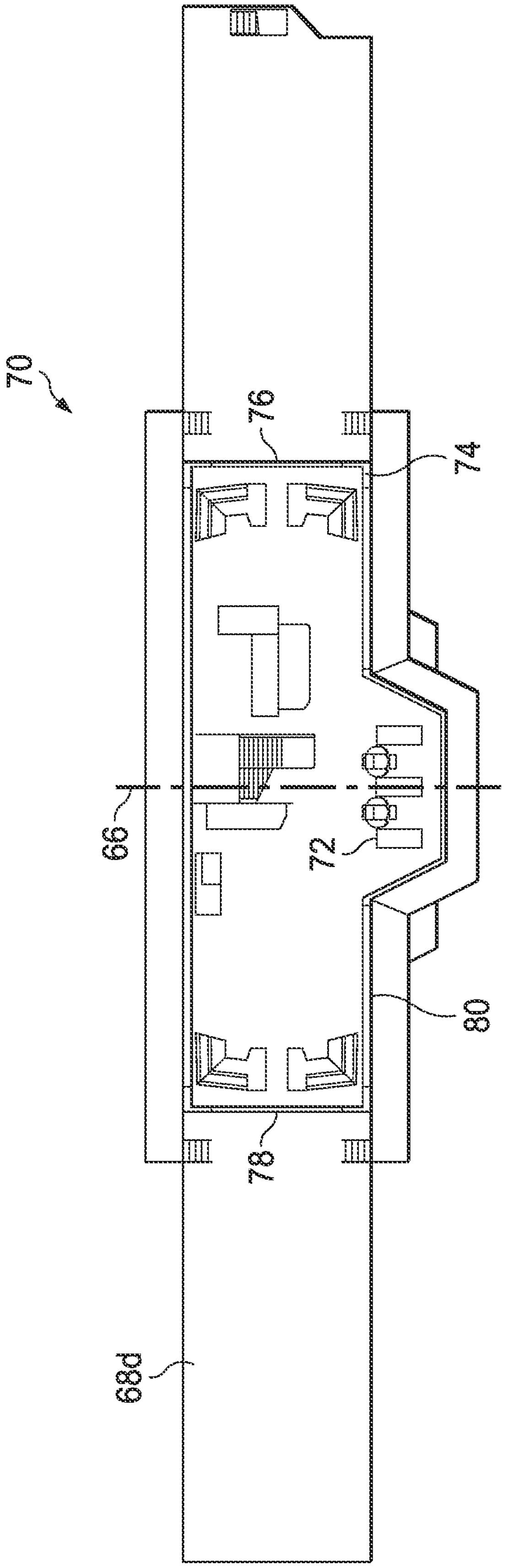
FIG. 18 is a plan view of the bridge deck of the accommodation structure.

With reference to FIG. 18, the bridge deck 68*d* and bridge 70 are illustrated. As used herein, a bridge refers to a structure mounted on a bridge deck which is enclosed by one or more exterior walls. In one or more embodiments, a wheelhouse 72 may extend from the bridge 70 out towards the first side 18 of the hull 12 (see FIG. 16). In one or more embodiments, the bridge 70 includes an elongated bridge wall 74 that is substantially parallel with the first hull side 18, a bow wall 76 extending from one end of the elongated bridge wall 74 and a stem wall 78 extending from the other end of the elongated bridge wall 74. In one or more embodiments, windows 80 extend substantially the full length of the walls 74, 76, 78 of the bridge 70, thereby permitting a full, unobstructed view of the main deck 26*d* of the hull 12.

Figure 19A:
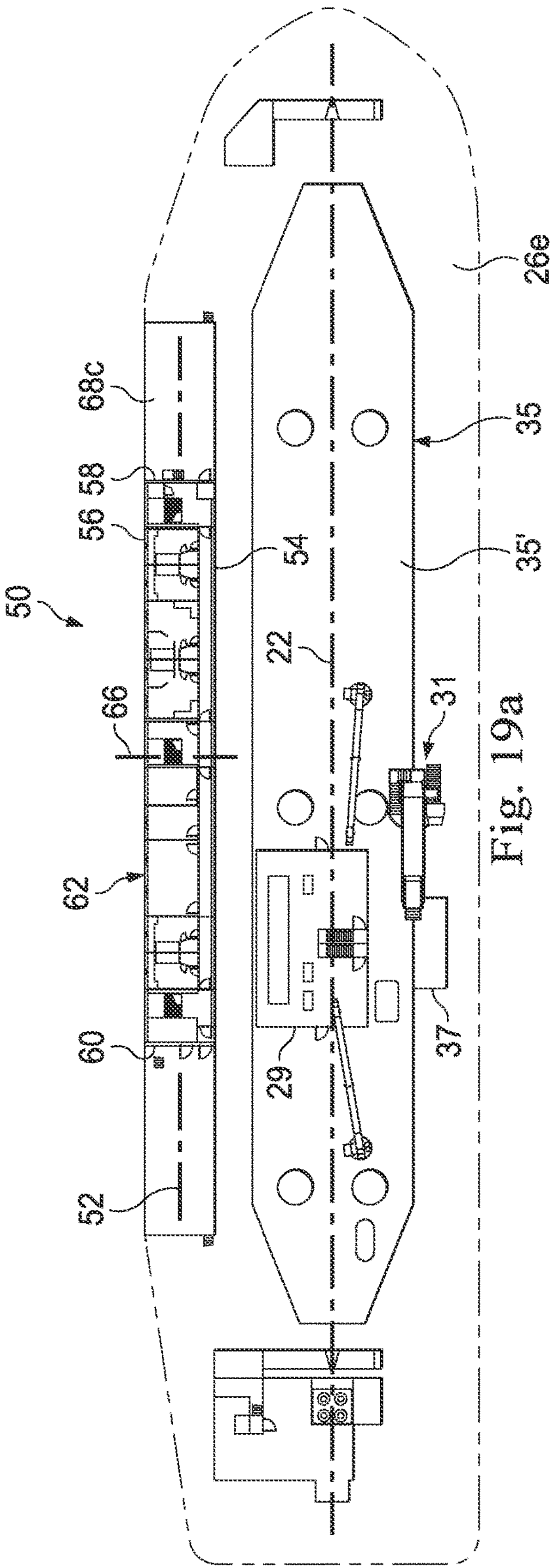
FIGS. 19*a* and 19*b* are plan views of an upper mid-deck of the accommodation structure extending along a side of a fuel bunkering vessel.
Figure 19B:
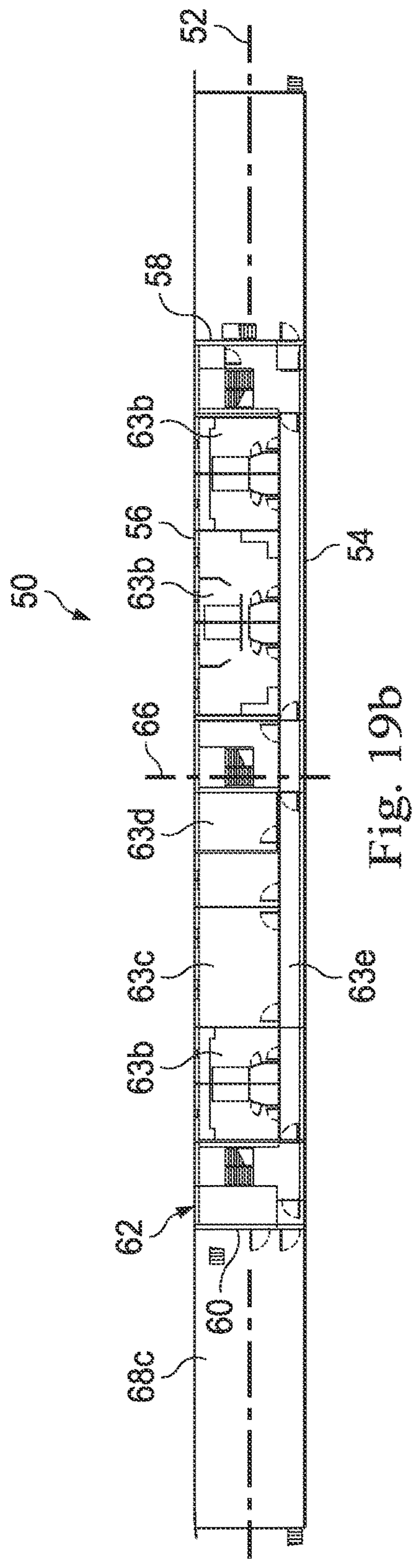

Turning to FIGS. 19*a* and 19*b*, mid-deck 68*c* of accommodation structure 50 is illustrated more specifically. As noted above, accommodation structure 50 is a multi-deck structure that rises above the main deck 26*e* of bunkering vessel 10' with at least a portion of the accommodation structure 50 being fully enclosed. In one or more embodiments, at least a portion of a plurality of accommodation structure decks 68 are fully enclosed to form various interior spaces 63. As used herein, a fully enclosed refers to a structure that is generally enclosed by one or more exterior walls. Thus, in FIG. 19*b*, the portion of accommodation structure 50 on mid-deck 68*c* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. in the illustrated embodiments, interior spaces 63 may include a store 63*a*, officer quarters 63*b*, offices 63*c*, instrument room 63*d* and an accommodation corridor 63*e*.

For embodiments where bunkering marine vessel 10' is disposed for carrying LNG as the bunkering fuel, bunkering marine vessel 10' may include a reliquification equipment 29, such as is illustrated on shown on deck 5 or main deck 26*e* in the Figures. In addition, a bunker station 37 is shown in FIG, 19*a*. In one or more embodiments, bunker station 37 is generally positioned adjacent first hull side 18 of vessel 10' since this is the side of vessel 10' that will positioned adjacent a ship to be fueled (not shown). A motion compensation gangway 31 is also shown mounted on main deck 26*d*, likewise, generally adjacent first hull side 18 to facilitate bunkering. Finally, a shell or cofferdam 35 may be positioned on main deck 26*e* to enclose portions of main bunkering fuel storage tanks 40*a*, 40*b*, 40*c* that may extend above main deck 26*e*.

Figure 20A:
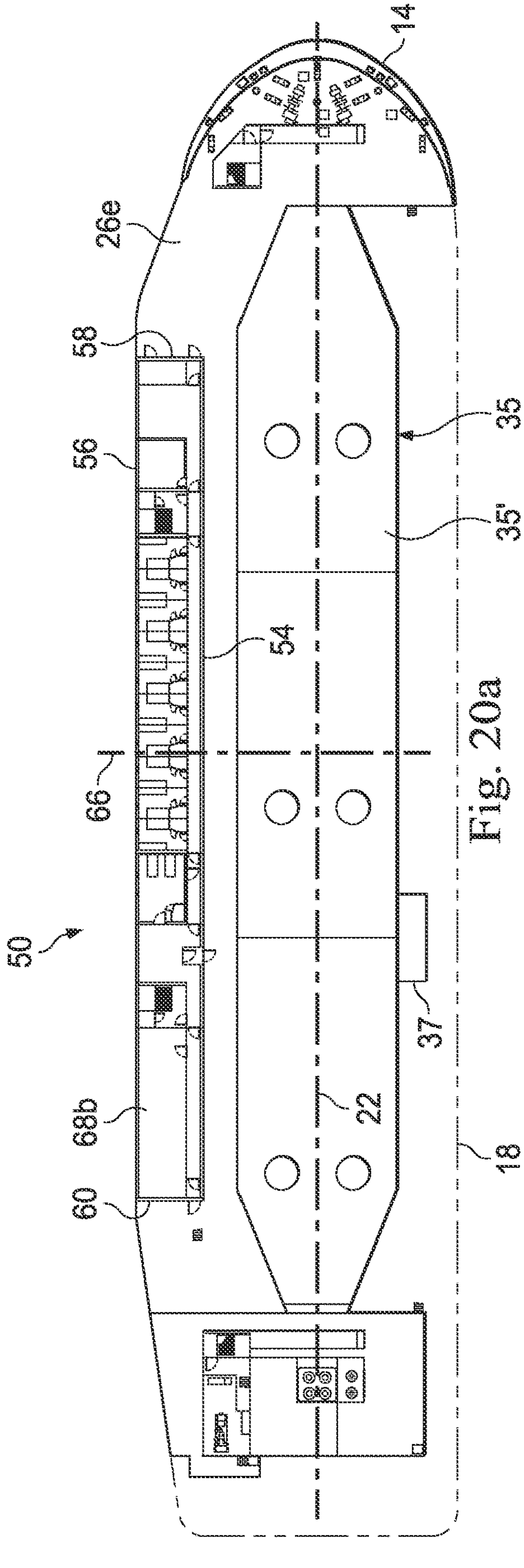
FIGS. 20*a* and 20*b* are plan views of a lower mid-deck of the accommodation structure extending along a side of a fuel bunkering vessel.
Figure 20B:
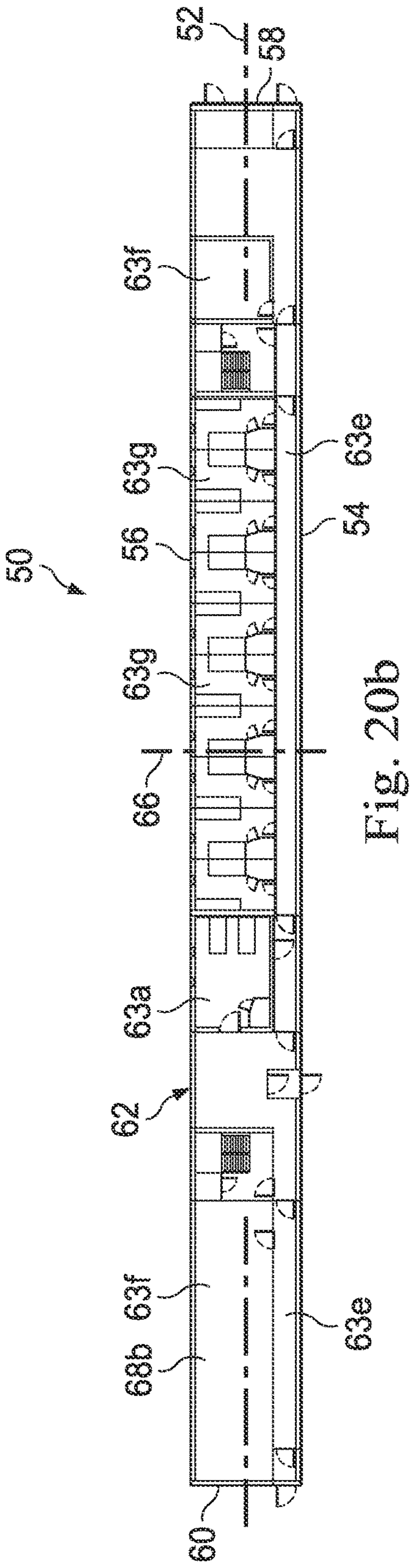

Turning to FIGS. 20*a* and 206, mid-deck 68*b* of accommodation structure 50 is illustrated more specifically. In one or more embodiments, at least a portion of mid-deck 686 is fully enclosed to form various interior spaces 63, Accommodation structure 50 on mid-deck 68*b* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. In the illustrated embodiments, interior spaces 63 may include store 63*a*, accommodation corridor 63*e*, an HVAC room 63*f*, crew quarters 63*g*, activity room 63*h* and galley 63*i*.

FIG. 20*a* also illustrates the top 35' of shell or cofferdam 35 as it is positioned on main deck 26*e* to enclose portions of main bunkering fuel storage tanks 40*a*, 40*b*, 40*c* that extend above main deck 26*e*.

In addition, a bunker station 37 is shown. In one or more embodiments, bunker station 37 is generally positioned adjacent first hull side 18 of vessel 10'.

Figure 21A:
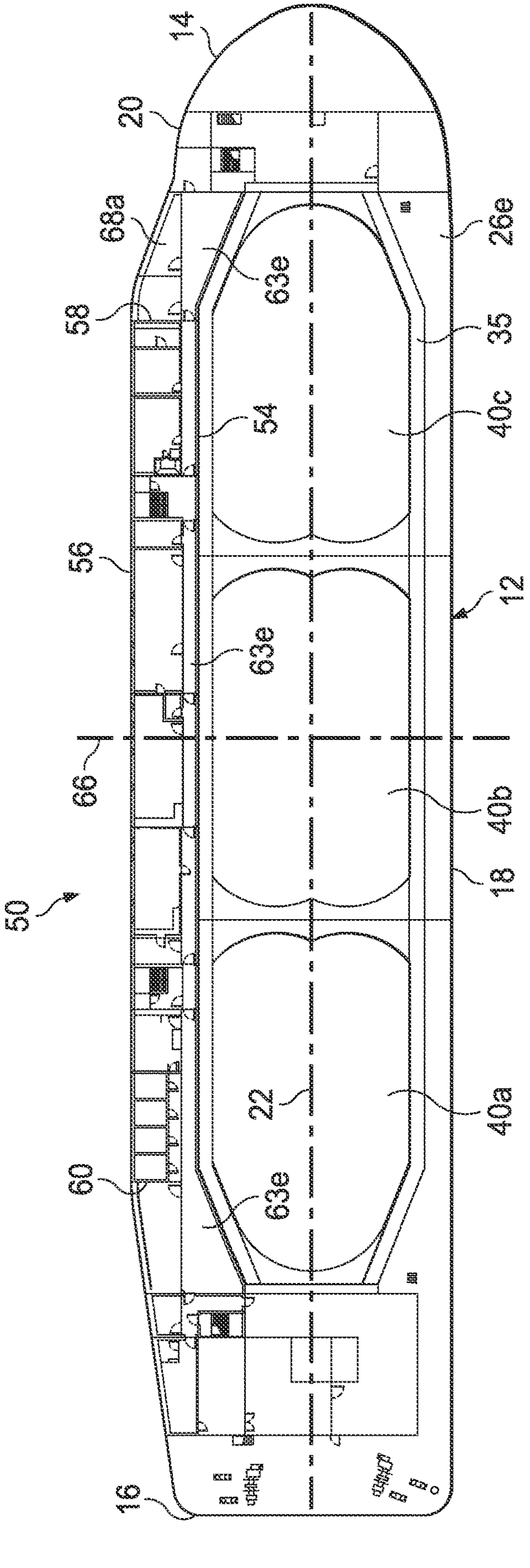
FIGS. 21*a* and 21*b* are plan views of the main vessel deck and the lower deck of the accommodation structure of a fuel bunkering vessel.
Figure 21B:
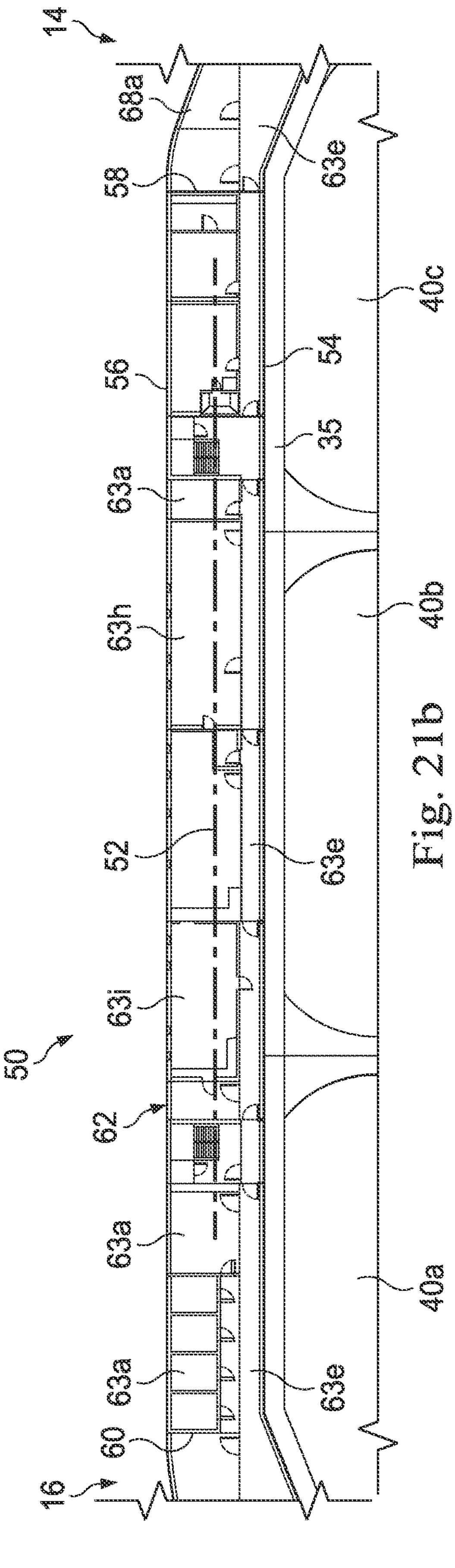

FIGS. 21*a* and 21*b* illustrate the lowest most deck 68*a* of accommodation structure 50. In one or more embodiments, deck 68*a* may form a part of main deck 26*e*, while in other embodiments, lowest most deck 26*e* of accommodation structure 50 may be elevated above main deck 26*e*. In one or more embodiments, at least a portion of deck 68*a* is fully enclosed to form various interior spaces 63. Accommodation structure 50 on deck 68*a* is generally formed of a first elongated exterior side 54 parallel with the main axis 52 of accommodation structure 50, a second elongated exterior side 56 substantially parallel with the first exterior side 54, and first and second exterior end walls 58, 60, all of which together form an enclosure 62 having interior spaces 63. In the illustrated embodiments, interior spaces 63 may include store 63*a*, accommodation corridor 63*e*, an HVAC room 63*f*, crew quarters 63*g*, activity room 63*h* and galley 63*i*. In this illustrated embodiment, deck 68*a* extends from bow end 14 to stem end 16 so as to provide an enclosed accommodation corridor 63*e* generally connecting bow end 14 to stern end 16.

FIG. 21*a* also illustrates shell or cofferdam 35 as it is positioned on main deck 26*e* to enclose portions of main bunkering fuel storage tanks 40*a*, 40*b*, 40*c* that extend above main deck 26*e*.

Figure 22:
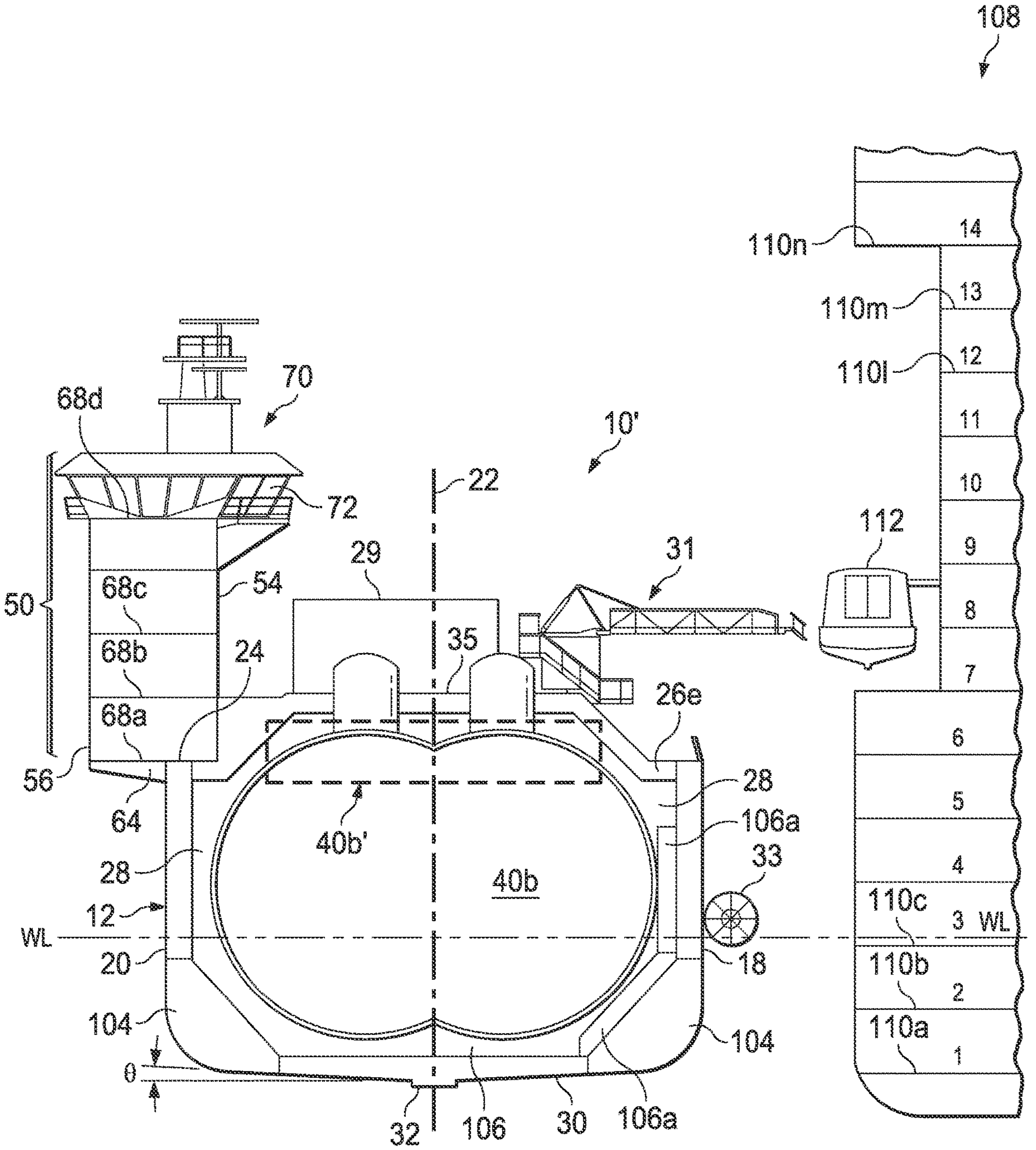
FIG. 22 is a cross-sectional end view of a fuel bunkering vessel taken along line A-A of FIG. 17.

Turning to FIG. 22, a section view of the fuel bunkering vessel 10' taken along section line A-A of FIG. 17 is illustrated. More specifically, a cross section of bunkering marine vessel 10' is taken through accommodation structure 50 to illustrate the spacing of accommodation structure 50 relative to fuel recipient ship 108 when fuel bunkering vessel 10' is alongside fuel recipient ship 108, such as during a bunkering operation. In such an operation, the first side 18 of vessel 10 is positioned adjacent or closest to ship 108 with fender 33 positioned along water WL therebetween. A gangway 31 may be pivoted to engage ship 108. In any event, as can be seen, accommodation structure 50 being formed along second side 20 of vessel 10', is spaced apart from ship 108 a distance of approximately the width of upper deck 26*d* when fender 33 abuts ship 108, An important feature of fuel bunkering vessel 10' in one or more embodiments is that accommodation structure 50 is offset to one side of fuel bunkering vessel 10' as compared to prior art hunkering ships having accommodation structures centrally located, such as about the centerline plane of a prior art bunkering vessel. By positioning accommodation structure 50 as shown, as fuel bunkering vessel 10' rolls under wave action or current, the likelihood of collision between accommodation structure 50 and ship 108 is minimized, even for multi-story accommodation structures. In this regard, such position allows for accommodation structure 50 to be multi-story and of greater height than prior art, centrally located accommodation structures. This, in turn, permits better views from accommodation structure 50, and thus better oversight of fuel bunkering operations. In one or more embodiments, accommodation structure 50 preferably includes at least two decks 68, such as decks 68*a* and 68*b*, with a portion of each deck fully enclosed, and with a bridge deck 68*d* and a bridge 70 mounted on top of the accommodation structure 50. As used herein, a fully enclosed portion of a deck refers to a deck that substantially spans the accommodation structure from side to side and end to end which structure is generally enclosed by one or more exterior walls. As used herein, a bridge refers to a structure mounted on a bridge deck which is enclosed by one or more exterior walls. In one or more embodiments, the lowest deck 68*a* of the accommodation structure 50 may be the same as the main deck 26*e* of hull 12. In some embodiments, main deck 26*e* of hull 12 may extend beyond the second hull side 20 to form the lowest accommodation structure deck 68*a*. In other embodiments, the lowest accommodation structure deck 68 may be raised above or otherwise separate from the main deck 26*e*. In one or more embodiments such as shown in the Figures, the accommodation structure 50 includes at least three full decks 68*a*. 68*b*, 68*c*. In one or more embodiments, a wheelhouse 72 may extend from the bridge 70 out towards the first side 18 of the hull 12. The bridge 70 is the part of the fuel bunkering vessel 10' from which the vessel 10' is commanded for maneuvering and navigation and which gives the bridge team the best view of the surrounding waters as well as a full view of main deck 26*d*.

In any event, multi-deck accommodation structure 50 is generally formed along a. main axis 52, a substantial portion of the accommodation structure 50 being is spaced apart from the centerline plane 22, positioned adjacent the edge 24 of the second hull side 20 and extending along a portion of the edge 24 of the second hull side 20. Accommodation structure 50 is generally formed of a first elongated exterior side 54 which faces the first hull side 18 and is generally parallel with but spaced apart from the centerline plane 22; a second elongated exterior side 56 which is positioned beyond the edge 24 of second hulls side 20 which together form an enclosure 62 having an enclosed volume.

FIG. 22 also illustrates cargo tank 106*a* asymmetrically positioned within hull 12 relative to centerline plane 22. Specifically, fuel cargo tank(s) 106*a* is positioned within hull 12 so as to be between centerline plane 22 and first hull side 18, so that the weight of fuel within fuel cargo tank(s) 106*a* can be utilized to counter the weight of accommodation structure 50 positioned along second hull side 20. In one or more embodiments, fuel cargo tank(s) 106*a* may extend along the length of first hull side 18, while in other embodiments, fuel cargo tank(s) 106*a* may one or more discreet cargo tanks positioned adjacent first hull side 18. Such fuel cargo tank(s) 106*a* may or may not be symmetrically positioned about amidships plane 66. In some embodiments, cargo tank 106*a* may extend through two or more decks.

Also shown in FIG. 22 is shell or cofferdam 35 positioned on main deck 26*e* to enclose an upper portion 40*b'* of main bunkering fuel storage tank 40*b* extending above main deck 26*e*. Finally, reliquification equipment 29 positioned adjacent main deck 26*e*. In particular, in this embodiment, reliquification equipment 29 is positioned above main deck 26*e* on cofferdam 35.

Figure 23:
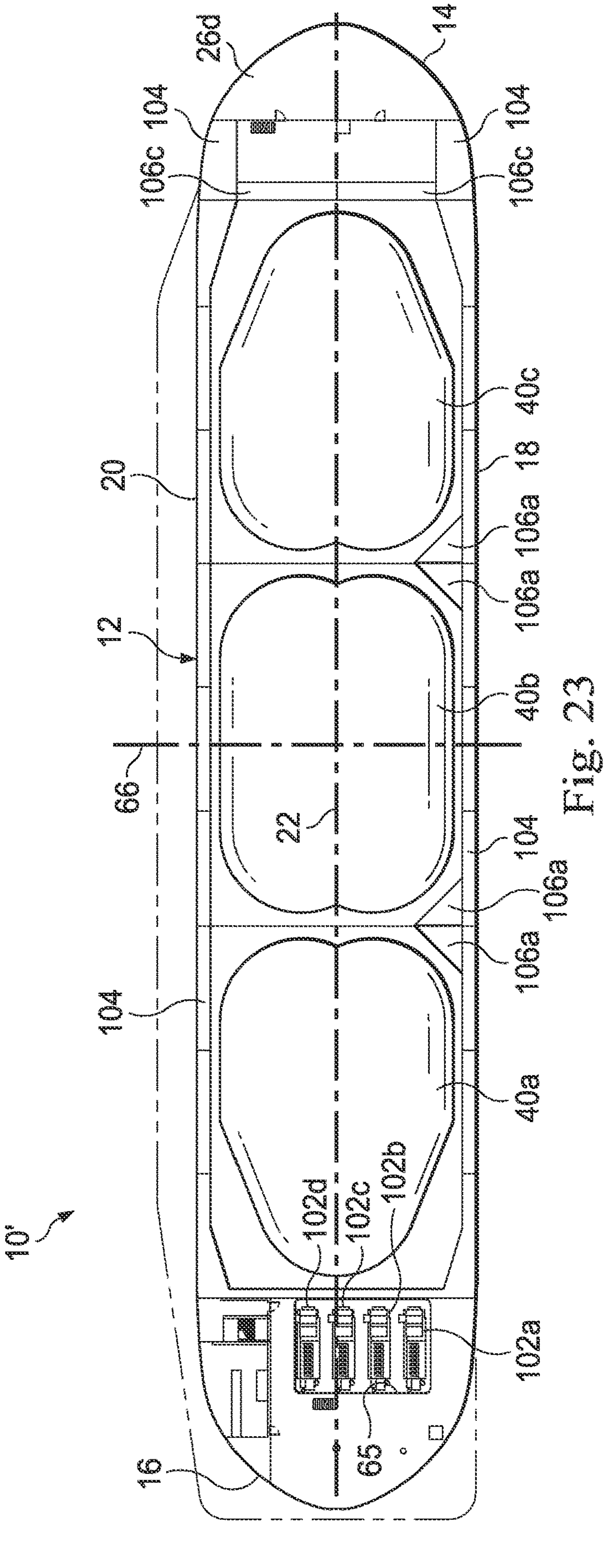
FIG. 23 is a plan view of the main deck of the fuel bunkering vessel shown in FIG. 14.

Turning to FIG. 23, a plan view of mid-deck 26*d* of hull 12 is illustrated. In the illustrated embodiment, at least one primary or main bunkering fuel storage tank 40 extends between the first and second sides 18, 20 of the hull 12 and is symmetrically positioned within the hull 12 along the centerline plane 22 and between the two hull ends 14, 16. Specifically, three primary or main bunkering fuel storage tanks 40*a*, 40*b*, 40*c* are symmetrically positioned within the hull 12 along the centerline plane 22 and between the two hull ends 14, 16.

Likewise, in one or more embodiments, the main bunkering fuel storage tanks 40*a*, 40*b*, 40*c* are substantially balanced about an amidships plane 66 equidistance between the two hull ends 14, 16. In other words, the main bunkering fuel storage tanks 40*a*, 40*b*, 40*c* are substantially symmetrical about the amidships plane 66, straddling the plane 66 so as to be equidistance between the two hull ends 14, 16.

In the illustrated embodiment, it will be appreciated that since main bunkering fuel storage tanks 40*a*, 40*b*, 40*c* are illustrated with respect to mid-deck 26*d*, the main bunkering fuel storage tanks 40*a*, 406, 40*c* are of a height rising from a lower deck, such as 26*a* or 26*h* or 26*c* (see FIG. 17), to extend up through at least mid-deck 26*d*. Thus, it will be appreciated that fuel cargo tanks 40*a*, 40*b*, 40*c*, fill a significant portion of the volume of hull 12.

As described above, in one or more embodiments, fuel hunkering vessel 10 also may include additional cargo tanks 106*a* selected and positioned adjacent the first hull side 18 to counter the weight of the accommodation structure 50 (see FIG. 16) located along the second hull side 20, much like the engine placement was selected to counter the weight of the accommodation structure 50. In the illustrated embodiment of FIG. 23, additional cargo tanks 106*a* are shown adjacent the first hull side 18 and positioned between the main bunkering fuel storage tanks 40*a*, 406, and 40*c*. In some embodiments, additional cargo tanks 106*a* may also be symmetrical generally about plane 66. In one or more embodiments, additional fuel bunkering cargo tanks 106*a* may be fuel tanks for engines 102, which fuel tanks may be utilized to counter the weight of the accommodation structure 50. Alternatively, additional fuel bunkering cargo tanks 106*a* may be water ballast tanks that may be utilized to counter the weight of the accommodation structure 50. Likewise, it will be appreciated that in addition to additional fuel bunkering cargo tanks 106*a* or in the alternative, water ballast tanks along first side 18 of hull 12 may be utilized to counter the weight of accommodation structure 50 along the second side 20 of hull 12. Further, FIG. 23 illustrates cargo tanks 106*c* positioned forward of bunkering fuel storage tank 40*b* at the bow end 14 of vessel 10. FIG. 23 also illustrates that cargo tanks 106*a* and 106*c* may extend up through multiple decks, such as mid-deck 26*d*.

Although not limited to a particular volume, for purposes of the illustrating the difference in volume between cargo tanks 106 and hunkering fuel storage tanks 40, each of the four illustrated discreet cargo tanks 106*a* may have a volume of approximately 90 $m^3$. In other embodiments, each discreet cargo tank 106*a* may have a volume of between 30 and 150 $m^3$.

Finally, FIG. 23 illustrates that deck 26*d* may include an opening 65 permitting access to engine(s) 102 positioned on lower deck 26*c*, in one or more embodiments, the bunkering marine vessel 10' includes at least two or more engines 102 for driving propulsion systems, while in other embodiments, the bunkering marine vessel 10' includes at least three or more engines 102 for driving propulsion systems. In the illustrated embodiment, four engines 102*a*, 102*b*, 102*c*, 102*d* are depicted. in some embodiments, an engine 102 is provided for each propulsion system 82 (see FIG. 14). In one or more embodiments, to compensate for the weight of the accommodation structure 50 being positioned along the second hull side 20 of the vessel 10', the engines 102 may be positioned asymmetrically about the centerline plane 22 so as to be closer to the first hull side 18 of the vessel 10'. Thus, in some embodiments with only one engine 102, the engine 102 would be positioned on a deck between the centerline plane 22 and the first hull side 18. In the illustrated embodiment with four engines, first and second engines 102*a*, 102*b* are positioned between the centerline plane 22 and the first hull side 18 with a third engine 102*c* positioned on the centerline plane 22. In the embodiment, the third engine 102*c* is asymmetrically divided by the centerline plane 22 so as to be nearer the first hull side 18 than the second hull side 20. Only the fourth engine 102*d* is positioned between the centerline plane 22 and the second hull side 20.

Figure 24:
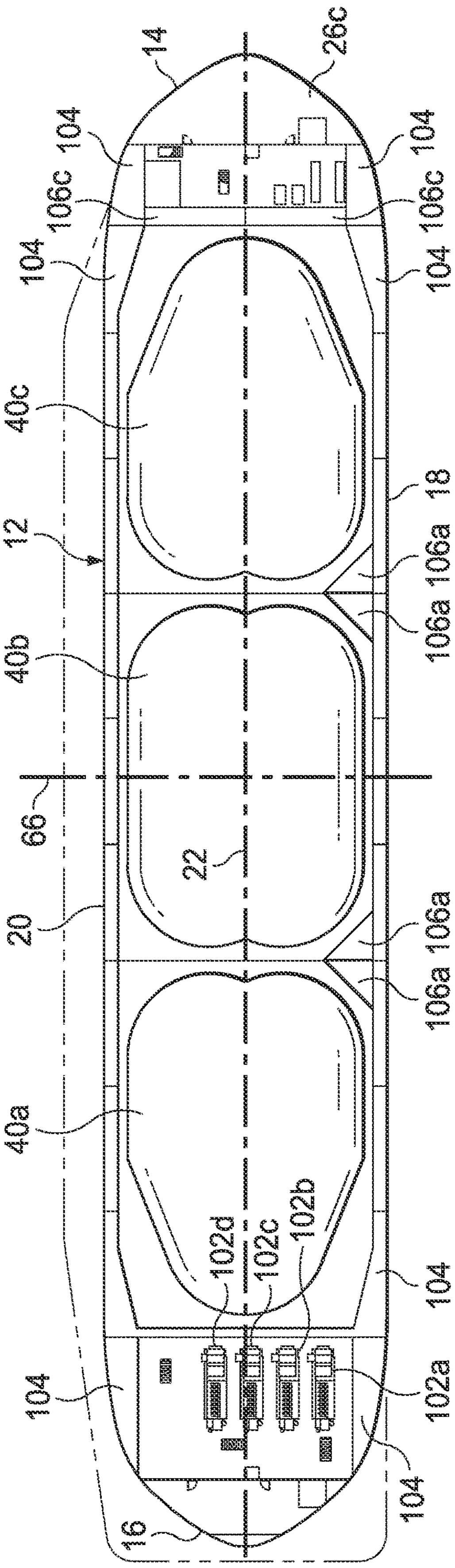
FIG. 24 is a plan view of an upper mid-deck of the hull of a fuel bunkering vessel.

Turning to FIG. 24, a plan view of mid-deck 26*c* of hull 12 is illustrated. Although the individual interior decks 26*a*-26*d* are not limited to a particular purpose, in the illustrated embodiment of deck 26*c*, engines 102*a*, 102*b*, 102*c* and 102*d* are deployed on deck 26*c*. In one or more embodiments, to compensate for the weight of the accommodation structure 50 being positioned along the second hull side 20 of the vessel 10', the engines 102 may be positioned asymmetrically about the centerline plane 22 so as to be closer to the first hull side 18 of the vessel 10'. Thus, in embodiments with only one engine 102, the engine 102 would be positioned on a deck between the centerline plane 22 and the first hull side 18. In the illustrated embodiment with four engines, first and second engines 102*a*, 102*b* are positioned between the centerline plane 22 and the first hull side 18 with a third engine 102*c* positioned on the centerline plane 22. In the embodiment, the third engine 102*c* is asymmetrically divided by the centerline plane 22 so as to be nearer the first hull side 18 than the second hull side 20. Only the fourth engine 102*d* is positioned between the centerline plane 22 and the second hull side 20.

FIG. 24 also illustrates main bunkering fuel storage tanks 40*a*, 40*b*, 40*c* and additional cargo tanks 106*a* and 106*c*, as described above, passing through mid-deck 26*c*.

Figure 25:
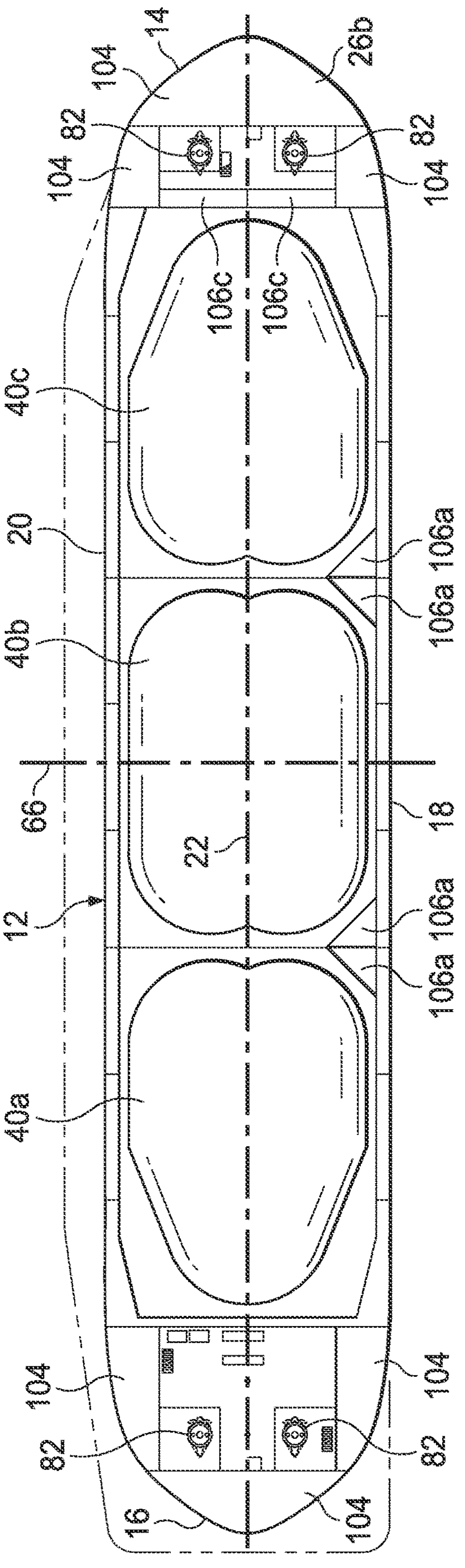
FIG. 25 is a plan view of a lower mid-deck of the hull of a fuel bunkering vessel.

Turning to FIG. 25, mid-deck 26*b* of hull 12 is illustrated. Although the individual interior decks 26*a*-26*d* are not limited to a particular purpose, in the illustrated embodiment, internal components of marine propulsion system 82 are mounted on deck 26*b*. Deck 26*b* may also include auxiliary equipment and/or additional stores.

In addition, as described above, three primary or main bunkering fuel storage tanks 40*a*, 40*b*, 40*c* are symmetrically positioned within the hull 12 along the centerline plane 22 and between the two hull ends 14, 16. Likewise, the main bunkering fuel storage tanks 40*a*, 40*b*, 40*c* are substantially balanced about an amidships plane 66 equidistance between the two hull ends 14, 16. In other words, the main bunkering fuel storage tanks 40*a*, 40*b*, 40*c* are substantially symmetrical about the amidships plane 66, straddling the plane 66 so as to be equidistance between the two hull ends 14, 16.

Moreover, additional cargo tanks 106*a* are shown adjacent the first hull side 18 and positioned between the main bunkering fuel storage tanks 40*a*, 40*b*, and 40*c*. In this embodiment, additional cargo tanks 106*a* are also generally symmetrical about plane 66. FIG. 24 also illustrates additional cargo tanks 106*c*, as described above, forward of main bunkering fuel storage tank 40*c* and passing through mid-deck 26*b*.

Figure 26:
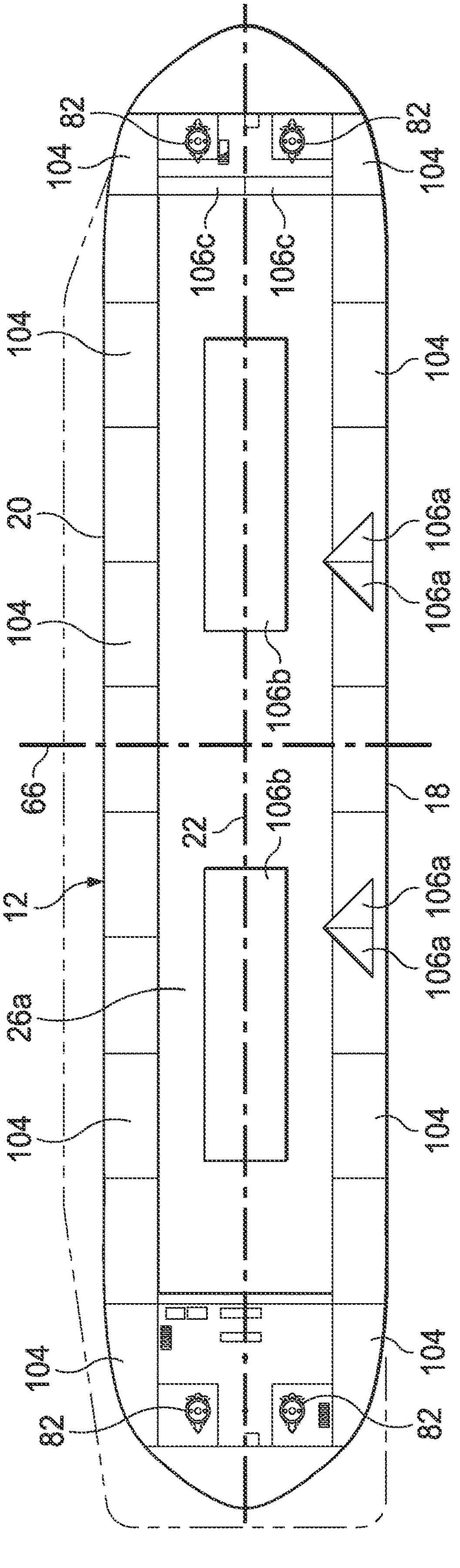
FIG. 26 is a plan view of the lowest deck of the hull of a fuel bunkering vessel.

Turning to FIG. 26, the orlop deck 26*a*, which is the lowermost or lowest full deck of the hull 12, is illustrated. Deck 26*a* is shown as having standard ballast tanks, such as the illustrated water ballast tanks 104, generally symmetrically positioned about the vessel 10', as is well known in the industry, about centerline plane 22 as well as amidships plane 66. Vessel 10' also may include additional cargo tanks 106*a* positioned adjacent first hull side 18 and spaced apart from second hull side 20 to counter the weight of the accommodation structure 50 (see FIG. 16) positioned along the second hull side 20. In the illustrated embodiments, additional cargo tanks 106*a* are shown adjacent the first hull side 18 and positioned between the main bunkering fuel storage tanks 40. As with the main bunkering fuel storage tanks 40, these additional cargo tanks 106*a* used for ballast purposes may extend from the lowest hull deck 26*a* to a height of just below the main deck 26*d*. Further, additional cargo tanks 106*b* are shown positioned along centerline plane 22. These additional cargo tanks 106*b* may be symmetrical about centerline plane 22 or positioned so as to be asymmetrical about centerline plane 22, spaced closer to first hull side 18 and spaced farther from second hull side 20. As stated above, such fuel cargo tank(s) 106*a* may or may not be symmetrically positioned about amidships plane 66. In some embodiments, cargo tank 106*a* may extend through two or more decks, such as the illustrated embodiment where cargo tanks 106*a*. are shown extending at least through mid-deck 26*b*.

In some embodiments, the primary or main bunkering fuel storage tank(s) 40 described above may be mounted on deck 26*a* and extend up through one or more mid-decks 26*b-c*, while in other embodiments, the primary or main bunkering fuel storage tank(s) 40 described above may be mounted on deck 26*b* and extend up through one or more mid-decks 26*c*. In some embodiments, main hunkering fuel storage tank(s) 40 may extend through main deck 26*d* and above the surface of main deck 26*d*.

In one or more embodiments, the bunkering fuel storage tank(s) 40 are self-supporting, independent tanks that do not form a part of the ship hull and are not essential to the hull strength. In one or more embodiments, the bunkering fuel storage tank(s) 40 are Type ‘C’ pressure vessels of a substantially spherical or cylindrical pressure shape. In one or more embodiments, the bunkering fuel storage tank(s) 40 are bi-lobe or multi-lobe in shape. In one or more embodiments, the bunkering fuel storage tank(s) 40 are formed of intersecting pressure vessels or bi-lobe type tanks which may be designed with a taper at the forward end of the ship. In one or more embodiments, the bunkering fuel storage tank(s) 40 are self-supported structures and do not participate in the strength of vessel 10. Moreover, such self-supporting structures are Type ‘C’ pressure vessels. In one or more embodiments, the bunkering fuel storage tank(s) 40 free standing shell structures. In one or more embodiments, the bunkering fuel storage tank(s) 40 are formed of a plurality of intersecting cylinders as can be seen in FIGS. 4 and 10. In this regard, the bunkering fuel storage tank(s) 40 may be a Cubic Doughnut Tank System (CDTS), namely a self-standing tank formed of a plurality of intersecting cylinders that formed the twelve edges of a cube. It will be understood that the tank surface thickness is such case may be significantly less than those of an equal volume spherical tank because of the less than half radius of the cylinders compared to the sphere. In one or more embodiments, the total volume of the bunkering fuel storage tank(s) 40 is at least 6000 $m^3$' and in some embodiments, at least 15,000 $m^3$.

In contrast, the additional cargo tanks 106 may be standard fuel storage tanks. In this regard, additional cargo tanks 106 may form a part of the hull 12 and provide strength to hull 12. In any event, additional cargo tanks 106 are not pressure vessels, and in particular, Type C pressure vessels, but may simply be storage tanks for fuel maintained at atmospheric pressure, Thus, additional cargo tanks 106 may be MGO cargo tanks as are well known in the industry. In one or more embodiments, the total volume of the additional cargo tanks 106 is no greater than approximately 1000 $m^3$ and in some embodiments, no greater than 700 $m^3$. Thus, a bunkering marine vessel has been described. In one or more embodiments, the bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull, with a keel between the first and second hull ends along the centerline plane; an upper deck extending between the hull sides so as to define a volume within the hull; at least one main bunkering fuel storage tank within the hull; and a multi-deck, elongated, enclosed accommodation structure extending along a portion of the length of the second hull side and spaced apart from the centerline plane. In other embodiments, the bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull; a deck extending between the hull sides so as to define a volume within the hull; at least one main bunkering fuel storage tank within the hull filling at least 50 of the volume within the hull; and an elongated accommodation structure extending along a portion of the length of the second hull side, the accommodation structure having at least a first deck and a second deck, and enclosed by first elongated exterior side facing the first hull side and a second elongated exterior side cantilevered from the second hull side, wherein the first elongated exterior side is spaced apart from the centerline plane. In still yet other embodiments, the bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull; a deck extending between the hull sides so as to define a hull interior and volume within the hull; at least one main bunkering fuel storage tank within the hull; and an elongated accommodation structure asymmetrically positioned adjacent the deck along the second hull end so as to be spaced apart from the centerline; and a bridge mounted on top of the accommodation structure. In other embodiments, the bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull; a deck extending between the hull sides so as to define a volume within the hull; at least one main bunkering fuel storage tank within the hull filling at least 50 of the volume within the hull; and an elongated accommodation structure, the accommodation structure having at least a first deck and a second deck, and enclosed by first elongated exterior side facing the first hull side and an opposing second elongated exterior side, wherein the first elongated exterior side is spaced apart from the centerline plane. In still yet other embodiments, the bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull; a deck extending between the hull sides so as to define a hull interior and volume within the hull; at least one main bunkering fuel storage tank within the hull; and an elongated accommodation structure asymmetrically positioned adjacent the spaced apart from the centerline; and a bridge mounted on top of the accommodation structure. In other embodiments, a bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull, with a keel between the first and second hull ends along the centerline plane; an upper deck extending between the hull sides so as to define a volume within the hull; at least one main hunkering fuel storage tank within the hull; and a multi-deck, elongated, enclosed accommodation structure extending along a portion of the length of the second hull side and spaced apart from the centerline plane. In other embodiments, a bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull with a keel between the first and second hull ends along the centerline plane; a main deck extending between the hull sides so as to define a volume within the hull; at least one main bunkering fuel storage tank within the hull filling at least 50% of the volume within the hull; and an elongated accommodation structure, the accommodation structure having at least a first deck and a second deck vertically spaced apart from one another and enclosed by first elongated exterior side facing the first hull side and an opposing second elongated exterior side, wherein the first elongated exterior side is spaced apart from the centerline plane. In other embodiments, a bunkering marine vessel may include a buoyant vessel having an elongated hull with a first hull side and an opposing second hull side, a first hull end and a second hull end and defining a centerline plane extending from the first hull end to the second hull end between the two hull sides, substantially bisecting the hull, with a keel between the first and second hull ends along the centerline plane, wherein the first hull end and the second hull end are substantially the same in shape; at least four decks extending between the hull sides and vertically spaced apart from one another, the at least four decks including a lowermost deck closest to the keel and an uppermost main deck with a hull volume defined within the hull between the main deck and the lowermost deck; at least one main bunkering fuel storage tank positioned within the hull and filling at least 50% of the hull volume and extending from adjacent the lowermost deck to adjacent the main deck, wherein the at least one main bunkering fuel storage tank is an LNG pressure vessel positioned along the centerline plane; at least one additional cargo tank, wherein the additional cargo tank is an atmospheric pressure fuel storage tank and has a total volume which is distributed asymmetrically about the centerline plane so as to be closer to the first hull side; an elongated accommodation structure extending along a portion of the length of the second hull side, the accommodation structure having at least a first deck, a second deck and a bridge deck vertically spaced apart from one another, the first and second accommodation structure decks enclosed by first elongated exterior side facing the first hull side and a second elongated exterior side, wherein the bridge deck is spaced apart from the centerline plane; a first marine propulsion system positioned adjacent the keel at the first hull end and a second marine propulsion system positioned adjacent the keel at the second hull end, wherein each marine propulsion system is disposed to swivel about a thruster axis.

For any of the foregoing embodiments, the marine bunkering vessel may include any one of the following elements, alone or in combination with each other:

At least three spaced apart decks extending between the hull sides.

At least two decks within the hull interior and extending between the hull sides, the at least two decks spaced apart from one another and the first deck.

At least four spaced apart decks extending between the hull sides within the hull interior.

The main bunkering fuel storage tanks are substantially symmetrical about the centerline plane.

The main bunkering fuel storage tanks filling at least 40 of the volume of the hull.

The main bunkering fuel storage tanks filling at least 60 of the volume of the hull.

The main bunkering fuel storage tanks extending from a lowermost deck to a height adjacent the main deck.

The main bunkering fuel storage tanks extending from a lowermost deck to a height of at least two decks above the lowermost deck.

The main bunkering fuel storage tanks extending from a lowermost deck to a height of at least one decks above the lowermost deck.

The main bunkering fuel storage tanks extending from adjacent the first hull side across the centerline plane to adjacent the second hull side.

The main bunkering fuel storage tanks extending from adjacent the first hull end to adjacent the second hull end.

The first hull end and the second hull end are substantially the same in shape.

The first hull end and the second hull end are substantially symmetrical about an amidships plane.

The first hull end and the second hull end below the waterline are substantially symmetrical about an amidships plane.

The first hull end and the second hull end adjacent the first and second decks are substantially symmetrical about an amidships plane.

The first hull end and the second hull end adjacent the lowermost full hull deck are substantially symmetrical about an amidships plane.

The first hull end and the second hull end adjacent the lowermost two full hull decks are substantially symmetrical about an amidships plane.

The first hull end and the second hull end blow the lowermost two full hull decks are substantially symmetrical about an amidships plane.

The first hull end and the second hull end below the lowermost full hull deck are substantially symmetrical about an amidships plane.

The first hull end and the second hull end are substantially the same in cross-sectional shape.

The first hull end and the second hull end have substantially the same rake angle.

The first hull end and the second hull end have substantially the same deadrise angle along the hull ends.

The first hull end and the second hull end are of the substantially same parabolic shape.

The first hull end and the second hull end have substantially the same rake and are of the substantially same parabolic shape.

The first hull end and the second hull end have substantially the same deadrise angle.

The hull further comprising a hull bottom, the hull bottom extending between the two hull sides and being substantially flat.

The hull having a deadrise of no more than 15 degrees.

The accommodation structure cantilevered from the second hull side.

At least half of the accommodation structure cantilevered from the second hull side.

The additional cargo tank is a fuel tank.

The additional cargo tank is an atmospheric pressure fuel tank.

The additional cargo tank is a water ballast tank.

An additional cargo tank positioned adjacent the first hull side.

An additional cargo tank positioned adjacent the first hull side and between two adjacent main bunkering fuel storage tanks.

The main bunkering fuel storage tanks are LNG tanks and the additional cargo tanks are MGO fuel tanks.

The main bunkering fuel storage tanks have a total volume of at least 15,000 $m^3$.

The main bunkering fuel storage tanks have a total volume of at least 5,000 $m^3$.

At least two main bunkering fuel storage tanks each have a volume of 3000 $m^3$.

At least two main bunkering fuel storage tanks each have a volume of 5000 $m^3$.

At least three main bunkering fuel storage tanks each have a volume of 5000 $m^3$.

A first marine propulsion system positioned adjacent the keel at the first hull end and a second marine propulsion system positioned adjacent the keel at the second hull end.

Each marine propulsion system is disposed to swivel at least 270 degrees on a thruster axis.

Each marine propulsion system is disposed to swivel 360 degrees on a thruster axis.

Two marine propulsion systems are provided at each hull end, spaced apart from one another on either side of the keel.

A seakeeping hull appendage positioned adjacent each marine propulsion system at each hull end.

A masthead spaced apart from the accommodation structure and positioned along the centerline plane.

A fire suppression system is disposed along a first exterior side of at least a portion of the length of the accommodation structure.

The fire suppression system extends along substantially the full exterior side length of the accommodation structure and mounted on the accommodation structure so as to be above main deck.

The fire suppression system extends along substantially the full length of the second deck of the accommodation structure.

The fire suppression system comprises a pipe extending along a portion of the length of the accommodation structure, and a plurality of nozzles disposed along the pipe and directed towards the main deck.

The pipe is generally parallel with the centerline plane and spaced apart from the centerline plane.

The fire suppression system further comprises a pump and reservoir in fluid communication with the pipe, the reservoir disposed to receive a fire suppressant The pipe is elevated above the main deck by the accommodation structure.

The pipe is affixed adjacent a deck positioned above the main deck.

At least one engine for driving a propulsion system.

At least two or more engines for driving propulsion systems.

At least three or more engines for driving propulsion systems.

At least four engines for driving propulsion systems.

The engines are positioned asymmetrically about the centerline plane so as to be closer to the first hull side.

First, second, third and fourth engines, where the first and second engines are positioned between the centerline plane and the first hull side and the third engine positioned on the centerline plane.

Water ballast tanks symmetrically positioned within the hull about the centerline plane.

An additional fuel cargo tanks positioned adjacent only the first bull side.

The additional fuel cargo tanks are adjacent the first hull side and positioned between the main bunkering fuel storage tanks.

The hull end has rake angle of no more than 20 degrees.

At least two main bunkering fuel storage tanks.

At least three thee main bunkering fuel storage tanks.

The hull end has rake angle is approximately 12 degrees.

Each bunkering fuel storage tank is a self-supporting, independent Type 'C' pressure vessel.

Each bunkering fuel storage tank is an LNG storage tank.

Each bunkering fuel storage tank is at least a bi-lobe system comprised of at least two intersecting pressure vessels.

Each bunkering fuel storage tank is a free-standing shell pressure vessel.

Each bunkering fuel storage tank is formed of a plurality of intersecting cylinders.

Each bunkering fuel storage tank comprises a Cubic Doughnut Tank System (CDTS).

The total volume of the bunkering fuel storage tank of the vessel is at least 6000 $m^3$.

The total volume of the bunkering fuel storage tank of the vessel is at least 15,000 $m^3$.

The additional cargo tank is a standard fuel storage tank.

The additional cargo tank is an atmospheric pressure storage tank.

The additional cargo tank is an MGO cargo tank.

The total volume of the additional cargo tanks is no greater than approximately 1000 $m^3$.

The total volume of the additional cargo tanks is no greater than approximately 1500 $m^3$.

The total volume of the additional cargo tanks is no greater than approximately 700 $m^3$.

The additional cargo tank is integrally formed between the first and second hull sides.

A first marine propulsion system positioned. adjacent the keel at the first hull end and a second marine propulsion system positioned adjacent the keel at the second hull end.

Each marine propulsion system is disposed to swivel at least 180 degrees on a thruster axis.

At least two decks below the upper deck, the at least two decks extending between the hull sides and vertically spaced apart from the upper deck and one another; and at least two main bunkering fuel storage tanks within the hull, each main bunkering fuel storage tank comprising a pressure vessel of a height extending through at least one deck.

Each main bunkering fuel storage tank has a volume of at least 2500 $m^3$ and is free-standing within the hull.

Each main bunkering fuel storage tank is an LNG storage tank and is at least a bi-lobe system comprised of at least two intersecting pressure vessels.

An additional cargo tank, wherein the additional cargo tank is an atmospheric pressure fuel storage tank and has a total volume which is distributed asymmetrically about the centerline plane so as to be closer to the first hull side.

An additional cargo tank, wherein the additional cargo tank is an atmospheric pressure fuel storage tank and has a total volume which is distributed asymmetrically about the centerline plane so as to be closer to the first hull side, At least two main bunkering fuel storage tanks within the hull filling at least 50% of the volume within the hull, wherein each main bunkering fuel storage tank is an LNG storage tank comprising a pressure vessel.

The additional cargo tank is an MGO fuel tank.

A lowermost deck closest to the keel and extending between the hull sides, wherein at least one main bunkering fuel storage tank extends from adjacent the lowermost deck to a height adjacent the main deck.

Each main bunkering fuel storage tank extends from adjacent the lowermost deck to a height above the main deck.

At least two mid-decks vertically spaced from one another and from the main deck and lowermost deck, each mid-deck extending between the hull sides, wherein the at least one main bunkering fuel storage tank extends through the mid-decks.

A plurality of additional cargo tanks, wherein at least one additional cargo tank is positioned adjacent the first hull side and spaced apart from the centerline plane.

A greater number of the plurality of additional cargo tanks, are positioned between the centerline plane and the first hull side than are positioned between centerline plane and the second hull side.

Each main bunkering fuel storage tank is a at least a bi-lobe system comprised of at least two intersecting pressure vessels.

The second elongated exterior side is cantilevered from the second hull side.

The at least one main bunkering fuel storage tank is substantially symmetrically positioned about an amidships plane perpendicularly extending between the first and second hull sides approximately midway between the first and second hull ends.

At least two main bunkering fuel storage tanks spaced apart from one another and symmetrically positioned about the amidships plane, wherein at least one additional cargo tank is positioned adjacent the amidships plane between the two main bunkering fuel storage tanks.

A fire suppression system disposed along the first exterior side of at least a portion of the length of the accommodation structure, the fire suppression system comprising a pipe extending along a portion of the length of the accommodation structure, and a plurality of nozzles disposed along the pipe and directed towards the main deck.

The fire suppression system extends along substantially the full exterior side length of the accommodation structure and is mounted on the accommodation structure above main deck.

At least two engines for driving propulsion systems, the engines positioned on a deck below the main deck and asymmetrically about the centerline plane so as to be closer to the first hull side. The at least two engines are of approximately the same size and weight and together have a total weight, wherein the engines are asymmetrically positioned so that a greater amount of the total weight of the at least two engines is distributed asymmetrically about the centerline plane so as to be closer to the first hull side.

First, second, third and fourth marine propulsion system, with two marine propulsion systems positioned adjacent the keel at the first hull end and two marine propulsion systems positioned adjacent the keel at the second hull end, wherein each marine propulsion system is disposed to swivel about a thruster axis; and first, second, third and fourth engines, where the first and second engines are positioned between the centerline plane and the first hull side and the third engine is positioned on the centerline plane.

The first hull end and the second hull end have substantially the same rake and are of the substantially same parabolic shape.

At least two main bunkering fuel storage tanks spaced apart from one another; and a plurality of additional cargo tanks, wherein at least one additional cargo tank is spaced apart from the centerline plane and positioned adjacent the second hull side between the two spaced apart main bunkering fuel storage tanks, wherein the two main hunkering fuel storage tanks each comprise a Cubic Doughnut Tank System and together have a total volume of at least 5000 $m^3$, and wherein the additional cargo tanks are marine gasoil tanks and together have a total volume of less than 1500 $m^3$, wherein a greater amount of the total volume of the additional cargo tanks is distributed asymmetrically about the centerline plane so as to be closer to the first hull side.

Although various embodiments have been shown and described, the disclosure is not limited to such embodiments and will be understood to include all modifications and variations as would be apparent to one skilled in the art. Therefore, it should be understood that the disclosure is not intended to be limited to the particular forms disclosed; rather, the intention is to cover all modifications, equivalents, and alternatives falling within the spirit and scope of the disclosure as defined by the appended claims.

What is claimed is:

1. A fuel transport marine vessel (10) comprising:

a buoyant vessel having an elongated hull (12) with a first hull side (18) and an opposing second hull side (20), a first hull end (14) and a second hull end (16) and defining a centerline plane (22) extending from the first hull end (14) to the second hull end (16) between the two hull sides (18) (20) substantially bisecting the hull (12) between the two hull sides (18) (20) and an amidships plane (66) defined between the two hull ends (14) (16) substantially bisecting the hull (12) between the two hull ends (14) (16), with a keel (32) between the first and second hull ends (14) (16) along the centerline plane (22);

an upper deck (26d) extending between the hull sides (18) (20) so as to define a volume (28) within the hull (12);

one or more main fuel storage tanks (40) within the hull (12), the main fuel storage tanks having a total storage tank volume, the total storage tank volume of the one or more main fuel storage tanks within the hull filling at least 50% of the hull volume;

at least two hull decks (26*a*) (26*b*) below the upper deck (26*d*), the at least two hull decks extending between the hull sides (18) (20), the main fuel storage tank (40) of a height extending through at least one hull deck (26); and a multi-deck, elongated, enclosed accommodation structure (50), wherein the accommodation structure has at least a first deck and a bridge deck vertically spaced apart from one another, the accommodation structure extending along a portion of the length of the second hull side (20) and across the amidships plane (66), the bridge deck spaced apart from the centerline plane (22).

2. The fuel transport marine vessel of claim 1, wherein the first hull end and the second hull end adjacent the lower most deck of the hull are substantially symmetrical about the amidships plane (66).

3. The fuel transport marine vessel of claim 2, wherein the first hull end and the second hull end have substantially the same rake angle, deadrise angle and are of the substantially same curved shape.

4. The fuel transport marine vessel of claim 3, further comprising a first marine propulsion system (82*a*) positioned adjacent the keel at the first hull end and a second marine propulsion system (82*b*) positioned adjacent the keel at the second hull end and wherein each marine propulsion system is disposed to swivel at least 90 degrees on a thruster axis.

5. The fuel transport marine vessel of claim 1, further comprising at least two main fuel storage tanks within the hull (12) filling at least 50% of the volume (28) within the hull (12).

6. The fuel transport marine vessel of claim 4, wherein each main fuel storage tank extends above the upper deck (26*d*).

7. The fuel transport marine vessel of claim 5, wherein each main fuel storage tank is a pressure vessel.

8. The fuel transport marine vessel of claim 5, wherein each main fuel storage tank is an LNG.

9. The fuel transport marine vessel of claim 1 further comprising:

an additional cargo tank (106), wherein the additional cargo tank is an atmospheric storage tank and has a total volume which is distributed asymmetrically about the centerline plane (22) so as to be closer to the first hull side (14).

10. The fuel transport marine vessel of claim 1, further comprising a lowermost deck (26*a*) closest to the keel (32) and extending between the hull sides (18) (20), wherein at least one main fuel storage tank (40) extends from adjacent the lowermost deck (26*a*) to a height adjacent the main deck (26*d*).

11. The fuel transport marine vessel of claim 10, wherein each main fuel storage tank (40) extends from adjacent the lowermost deck (26*a*) to a height above the main deck (26*d*).

12. The fuel transport marine vessel of claim 10, further comprising a plurality of additional cargo tanks (106*a*) (106*b*) (106*c*), wherein at least one additional cargo tank (106) is positioned adjacent the first hull side (18) and spaced apart from the centerline plane (22).

13. The fuel transport marine vessel of claim 12, wherein a greater number of the plurality of additional cargo tanks (106) are positioned between the centerline plane (22) and the first hull side (18) than are positioned between centerline plane (22) and the second hull side (20).

14. The fuel transport marine vessel of claim 1, wherein the accommodation structure has at least a first deck and a second deck vertically spaced apart from one another and enclosed by first elongated exterior side facing the first hull side and an opposing second elongated exterior side, wherein the first elongated exterior side is spaced apart from the centerline plane.

15. The fuel transport marine vessel of claim 14, wherein the second elongated exterior side (56) is cantilevered from the second hull side (20).

16. The fuel transport marine vessel of claim 1, the one or more main fuel storage tanks (40) are substantially symmetrically positioned about an amidships plane (66) perpendicularly extending between the first and second hull (18) (20) sides approximately midway between the first and second hull ends (14) (16).

17. The fuel transport marine vessel of claim 16, further comprising at least two main fuel storage tanks (40*a*) (40*b*) spaced apart from one another and symmetrically positioned about the amidships plane (66), wherein at least one additional cargo tank (106*b*) is positioned adjacent the amidships plane (66) between the two main fuel storage tanks (40*a*) (40*b*).

18. The fuel transport marine vessel of claim 14, further comprising a fire suppression system (92) disposed along the first exterior side (54) of at least a portion of the length of the accommodation structure (50), the fire suppression system (92) comprising a pipe (94) extending along a portion of the length of the accommodation structure (50), and a plurality of nozzles (96) disposed along the pipe (94) and directed towards the main deck (26*a*).

19. The fuel transport marine vessel of claim 18, wherein the fire suppression system (92) extends along substantially the full exterior side (54) length of the accommodation structure (50) and is mounted on the accommodation structure (50) above main deck (26*d*).

20. The fuel transport marine vessel of claim 1, further comprising at least two engines (102*a*) (102*b*) for driving propulsion systems (84), the engines (102*a*) (102*b*) positioned on a deck below the main deck (26*d*) and asymmetrically about the centerline plane (22) so as to be closer to the first hull side (18).

21. The fuel transport marine vessel of claim 20, wherein the at least two engines (102*a*) (102*b*) are of approximately the same size and weight and together have a total weight, wherein the engines are asymmetrically positioned so that a greater amount of the total weight of the at least two engines (102*a*) (102*b*) is distributed asymmetrically about the centerline plane (22) so as to be closer to the first hull side (18).

22. The fuel transport marine vessel of claim 21, further comprising first, second, third and fourth marine propulsion systems (82*a*) (82*b*) (82*c*) (82*d*), with two marine propulsion systems positioned adjacent the keel (32) at the first hull end (14) and two marine propulsion systems positioned adjacent the keel (32) at the second hull end (16), wherein each marine propulsion system is disposed to swivel about a thruster axis (86); and first, second, third and fourth engines, where the first and second engines (86*a*) (86*b*) are positioned between the centerline plane (22) and the first hull side (18) and the third engine (86*b*) is positioned on the centerline plane (22).

23. A bunkering marine vessel (10) comprising:

a buoyant vessel having an elongated hull (12) with a first hull side (18) and an opposing second hull side (20), a first hull end (14) and a second hull end (16) and defining a centerline plane (22) extending from the first hull end (14) to the second hull end (16) between the two hull sides (18) (20), substantially bisecting the hull (12) between the two hull sides (18) (20) and an amidships plane (66) defined between the two hull ends (14) (16) substantially bisecting the hull (12) between the two hull ends (14) (16);

an upper deck (26*d*) extending between the hull sides (18) (20) so as to define a hull volume (28) within the hull (12);

at least one deck (26*a*) below the upper deck (26*d*), the at least one deck (26*a*) extending between the hull sides (18) (20);

one or more main bunkering fuel storage tanks (40) within the hull (12), the main bunkering fuel storage tanks (40) having a total storage tank volume, the total storage tank volume of the one or more main bunkering fuel storage tanks (40) within the hull (12) filling at least 50% of the hull volume (28;

one or more additional cargo tanks (106), wherein the one or more additional cargo tanks (106) are atmospheric storage tanks and have a total cargo tank volume which is distributed asymmetrically about the centerline plane (22) so that a greater portion of the total cargo tank volume of the one or more additional cargo tanks is closer to the first hull side (18); and a multi-deck enclosed accommodation structure (50), the accommodation structure (50) having at least a first deck, a second deck and a bridge deck vertically spaced apart from one another, the accommodation structure extending along a portion of the length of the second hull side (20) and across the amidships plane (66), the bridge deck spaced apart from the centerline plane (22).

24. The bunkering marine vessel of claim 23, further comprising at least two decks (26*a*) (26*b*) below the upper deck (26*d*), the at least two decks (26*a*) (26*b*) extending between the hull sides (18) (20); at least two main bunkering fuel storage tanks (40*a*) (40*b*) spaced apart from one another, each main bunkering fuel storage tank (40) of a height extending through at least one deck (26); and a plurality of additional cargo tanks (106*a*) (106*b*) (106*c*), wherein at least one additional cargo tank (106) is spaced apart from the centerline plane (22) and positioned adjacent the first hull side (18) between the spaced apart main bunkering fuel storage tanks (40*a*) (40*b*).

25. A bunkering marine vessel comprising:

a buoyant vessel having an elongated hull with a first hull side and an opposing second hull side, a first hull end and a second hull end and defining a centerline plane extending from the first hull end to the second hull end between the two hull sides, substantially bisecting the hull, with a keel between the first and second hull ends along the centerline plane;

an upper deck extending between the hull sides so as to define a volume within the hull;

at least one main bunkering fuel storage tank within the hull;

at least two decks below the upper deck, the at least two decks extending between the hull sides; and at least two main bunkering fuel storage tanks within the hull, each main bunkering fuel storage tank of a height extending through at least one deck; and a multi-deck, elongated, enclosed accommodation structure extending along a portion of the length of the second hull side and spaced apart from the centerline plane.

26. The bunkering marine vessel of claim 25, further comprising an additional cargo tank, wherein the additional cargo tank is an atmospheric storage tank and has a total volume which is distributed asymmetrically about the centerline plane so as to be closer to the first hull side.

27. The bunkering marine vessel of claim 25, wherein the accommodation structure has at least a first deck and a second deck vertically spaced apart from one another and enclosed by a first elongated exterior side facing the first hull side and an opposing second elongated exterior side, wherein the first elongated exterior side is spaced apart from the centerline plane.

28. The bunkering marine vessel of claim 27, wherein the accommodation structure extends across an amidships plane perpendicularly extending between the first and second hull sides approximately midway between the first and second hull ends.

29. The bunkering marine vessel of claim 23, wherein the one or more main bunkering fuel storage tanks are LNG vessels and the one or more additional cargo tanks are bunkering fuel vessels.

30. The bunkering marine vessel of claim 23, wherein the one or more main bunkering fuel storage tanks are pressure vessels.

31. The bunkering marine vessel of claim 23, wherein the one or more main bunkering fuel storage tanks are pressure vessels and the one or more additional cargo tanks are water ballast vessels.

* * * * *